United States Patent
Kim et al.

(10) Patent No.: US 9,225,005 B2
(45) Date of Patent: Dec. 29, 2015

(54) POSITIVE-ELECTRODE MATERIAL FOR LITHIUM SECONDARY-BATTERY, PROCESS FOR PRODUCING THE SAME, POSITIVE ELECTRODE FOR LITHIUM SECONDARY BATTERY, AND LITHIUM SECONDARY BATTERY

(71) Applicants: Jungmin Kim, Ibaraki (JP); Kenji Shizuka, Ibaraki (JP)

(72) Inventors: Jungmin Kim, Ibaraki (JP); Kenji Shizuka, Ibaraki (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 455 days.

(21) Appl. No.: 13/632,787

(22) Filed: Oct. 1, 2012

(65) Prior Publication Data

US 2013/0029216 A1    Jan. 31, 2013

Related U.S. Application Data

(63) Continuation of application No. PCT/JP2011/057986, filed on Mar. 30, 2011.

(30) Foreign Application Priority Data

Apr. 1, 2010  (JP) .................................. 2010-085563

(51) Int. Cl.
   *H01M 4/04*     (2006.01)
   *C01G 45/12*    (2006.01)
   (Continued)

(52) U.S. Cl.
   CPC ......... *H01M 4/0471* (2013.01); *C01G 45/1228* (2013.01); *C01G 45/1242* (2013.01); *C01G 53/50* (2013.01); *C01G 53/54* (2013.01); *H01M 4/0419* (2013.01); *H01M 4/1391* (2013.01); *H01M 4/366* (2013.01); *H01M 4/505* (2013.01); *H01M 4/525* (2013.01);
   (Continued)

(58) Field of Classification Search
   CPC ....................................................... H01M 4/134
   See application file for complete search history.

(56) References Cited

U.S. PATENT DOCUMENTS 5,290,592 A *  3/1994  Izuchi et al. .................. 427/203
6,368,749 B1   4/2002  Yanai et al.
(Continued)

FOREIGN PATENT DOCUMENTS

EP   2 523 240 A1   11/2012
JP   9-245787       9/1997
(Continued)

OTHER PUBLICATIONS

U.S. Appl. No. 13/544,431, filed Jul. 9, 2012, Takano, et al.
(Continued)

*Primary Examiner* — Ula C Ruddock
*Assistant Examiner* — Scott J Chmielecki
(74) *Attorney, Agent, or Firm* — Oblon, McClelland, Maier & Neustadt, L.L.P.

(57) ABSTRACT

A lithium-transition metal compound powder for a positive-electrode material of lithium secondary batteries can include a lithium-transition metal compound that is capable of an insertion and elimination of lithium ions. The particles in the powder contain, in the inner part thereof, a compound that, when analyzed by an SEM-EDX method, has peaks derived from Group-16 elements belonging to the third or later periods of the periodic table and Group-5 to Group-7 elements belonging to the fifth and sixth periods of the periodic table.

13 Claims, 9 Drawing Sheets

(51) Int. Cl.
| | |
|---|---|
| *C01G 53/00* | (2006.01) |
| *H01M 4/1391* | (2010.01) |
| *H01M 4/36* | (2006.01) |
| *H01M 4/505* | (2010.01) |
| *H01M 4/525* | (2010.01) |
| *H01M 10/052* | (2010.01) |
| *H01M 4/02* | (2006.01) |

(52) U.S. Cl.
CPC ........ *H01M 10/052* (2013.01); *C01P 2002/32* (2013.01); *C01P 2004/03* (2013.01); *C01P 2006/12* (2013.01); *C01P 2006/16* (2013.01); *C01P 2006/17* (2013.01); *C01P 2006/40* (2013.01); *H01M 2004/021* (2013.01); *Y02E 60/122* (2013.01); *Y02T 10/7011* (2013.01)

(56) References Cited

U.S. PATENT DOCUMENTS

| | | | |
|---|---|---|---|
| 8,623,551 B2* | 1/2014 | Kawahashi et al. | 429/218.1 |
| 8,697,284 B2* | 4/2014 | Shinya et al. | 429/218.1 |
| 2003/0124424 A1 | 7/2003 | Takahashi et al. | |
| 2003/0211390 A1* | 11/2003 | Dahn et al. | 429/218.1 |
| 2004/0197654 A1 | 10/2004 | Barker et al. | |
| 2005/0106463 A1 | 5/2005 | Kikuchi et al. | |
| 2005/0153206 A1 | 7/2005 | Oesten et al. | |
| 2005/0158546 A1 | 7/2005 | Shizuka | |
| 2005/0191202 A1* | 9/2005 | Iwasaki et al. | 419/28 |
| 2005/0208379 A1* | 9/2005 | Musha et al. | 429/231.95 |
| 2005/0271945 A1 | 12/2005 | Takahashi et al. | |
| 2006/0093549 A1 | 5/2006 | Takahashi et al. | |
| 2006/0134521 A1 | 6/2006 | Shima | |
| 2006/0166098 A1* | 7/2006 | Tabuchi et al. | 429/232 |
| 2006/0194112 A1 | 8/2006 | Barker et al. | |
| 2007/0141468 A1 | 6/2007 | Barker | |
| 2007/0202405 A1 | 8/2007 | Shizuka et al. | |
| 2007/0231695 A1 | 10/2007 | Kikuchi et al. | |
| 2007/0292764 A1 | 12/2007 | Soma et al. | |
| 2008/0050652 A1* | 2/2008 | Hirose et al. | 429/200 |
| 2008/0182169 A1 | 7/2008 | Shizuka | |
| 2009/0011334 A1 | 1/2009 | Shizuka et al. | |
| 2009/0017374 A1* | 1/2009 | Saito et al. | 429/199 |
| 2009/0104530 A1* | 4/2009 | Shizuka et al. | 429/223 |
| 2009/0314985 A1 | 12/2009 | Malcus et al. | |
| 2010/0015514 A1* | 1/2010 | Miyagi et al. | 429/129 |
| 2010/0019194 A1* | 1/2010 | Fujiwara et al. | 252/182.1 |
| 2010/0062337 A1 | 3/2010 | Sun | |
| 2010/0209771 A1* | 8/2010 | Shizuka et al. | 429/207 |
| 2010/0261063 A1* | 10/2010 | Kitagawa et al. | 429/232 |
| 2010/0266899 A1 | 10/2010 | Barker et al. | |
| 2010/0285342 A1* | 11/2010 | Lee et al. | 429/94 |
| 2010/0290969 A1* | 11/2010 | Deiseroth et al. | 423/300 |
| 2011/0003200 A1* | 1/2011 | Shizuka et al. | 429/206 |
| 2011/0081580 A1* | 4/2011 | Stadler et al. | 429/319 |
| 2011/0097625 A1* | 4/2011 | Bedjaoui et al. | 429/185 |
| 2011/0159368 A1* | 6/2011 | Hirose et al. | 429/219 |
| 2011/0177398 A1* | 7/2011 | Affinito et al. | 429/325 |
| 2011/0229765 A1 | 9/2011 | Barker et al. | |
| 2011/0256453 A1 | 10/2011 | Kikuchi et al. | |
| 2012/0225350 A1 | 9/2012 | Soma et al. | |
| 2012/0270107 A1* | 10/2012 | Toya et al. | 429/223 |
| 2012/0305835 A1* | 12/2012 | Yamaguchi | 252/182.1 |

FOREIGN PATENT DOCUMENTS

| | | |
|---|---|---|
| JP | 2001-6672 | 1/2001 |
| JP | 2003-297360 | 10/2003 |
| JP | 2004-14296 | 1/2004 |
| JP | 2005-108448 | 4/2005 |
| JP | 2006-172753 | 6/2006 |
| JP | 2006-523368 | 10/2006 |
| JP | 2007-335331 | 12/2007 |
| JP | 2008-529253 | 7/2008 |
| JP | 2008-270161 | 11/2008 |
| JP | 2008-305777 | 12/2008 |
| JP | 2009-104794 | 5/2009 |
| JP | 2009-289758 | 12/2009 |
| JP | 2010-505732 | 2/2010 |
| JP | 2010-064907 | 3/2010 |
| JP | 2012-23015 | 2/2012 |
| WO | WO 03/083969 A1 | 10/2003 |
| WO | WO 2004/102702 A1 | 11/2004 |
| WO | WO 2005/031899 A1 | 4/2005 |
| WO | WO 2005/104274 A1 | 11/2005 |
| WO | WO 2006/085467 A1 | 8/2006 |
| WO | WO 2007/116971 A1 | 10/2007 |
| WO | WO 2008/078695 A1 | 7/2008 |
| WO | WO 2009/031619 A1 | 3/2009 |
| WO | WO 2009047254 A1 * | 4/2009 |

OTHER PUBLICATIONS

International Search Report issued Jul. 5, 2011 in PCT/JP2011/057986.

Supplementary European Search Report dated Jul. 15, 2015, in corresponding European Patent Application No. 11765622.3.

\* cited by examiner

POSITIVE-ELECTRODE MATERIAL FOR LITHIUM SECONDARY-BATTERY, PROCESS FOR PRODUCING THE SAME, POSITIVE ELECTRODE FOR LITHIUM SECONDARY BATTERY, AND LITHIUM SECONDARY BATTERY

TECHNICAL FIELD

The present invention relates to a positive-electrode active material for use in lithium secondary batteries, a process for producing the same, a positive electrode for lithium secondary batteries which employs the positive-electrode active material, and a lithium secondary battery which is equipped with the positive electrode for lithium secondary batteries.

BACKGROUND ART

Lithium secondary batteries are excellent in terms of energy density, output density, etc. and are effective for a size reduction and a weight reduction. There is hence a rapidly growing demand for the use of lithium secondary batteries as the power sources of portable appliances such as notebook type personal computers, portable telephones, and handy video cameras. Lithium secondary batteries are attracting attention also as power sources for electric vehicles or for leveling the load of electric power, etc. In recent years, there is a rapidly growing demand for the use of the batteries as power sources for hybrid electric vehicles. Especially for use in electric-vehicle applications, the batteries are required to be excellent in terms of low cost, safety, life (in particular, high-temperature life), and load characteristics, and improvements in material are desired.

A substance having the function of being capable of elimination and insertion of lithium ions is usable as a positive-electrode active material among the materials which constitute a lithium secondary battery. There are various kinds of positive-electrode active materials, and these active materials each have features. Common subjects for performance improvements include an improvement in load characteristics, and there is a strong desire for improvements in material.

Furthermore, there is a need for a material which is excellent in terms of low cost, safety, and life (in particular, high-temperature life) and which has a satisfactory balance among performances.

At present, lithium-manganese composite oxides having a spinel structure, lamellar lithium-nickel composite oxides, lamellar lithium-cobalt composite oxides, and the like have been put to practical use as positive-electrode active materials for lithium secondary batteries. The lithium secondary batteries employing these lithium-containing composite oxides each have both advantages and disadvantages concerning battery characteristics. Specifically, the lithium-manganese composite oxides having a spinel structure are inexpensive and relatively easy to synthesize and give batteries having excellent safety, but these batteries have a low capacity and are inferior in high-temperature characteristics (cycle characteristics, storability). The lamellar lithium-nickel composite oxides attain a high capacity and excellent high-temperature characteristics, but have drawbacks, for example, that these composite oxides are difficult to synthesize and give batteries which have poor safety to require care when stored. The lamellar lithium-cobalt composite oxides are easy to synthesize and attain an excellent balance among battery performances and, hence, batteries employing these composite oxides are in extensive use as power sources for portable appliances. However, insufficient safety and a high cost are serious drawbacks of the lamellar lithium-cobalt composite oxides.

Under such current circumstances, a lithium-nickel-manganese-cobalt composite oxide having a lamellar structure has been proposed as a promising active material in which the drawbacks of those positive-electrode active materials have been overcome or minimized and which attains an excellent balance among battery performances. Especially under the recent situation in which a cost reduction, an increase in voltage, and higher safety are increasingly required, the proposed composite oxide is regarded as a promising positive-electrode active material which is capable of satisfying all the requirements.

Hitherto, attempts have been made to improve the properties of a lithium-nickel-manganese-cobalt composite oxide as a positive-electrode active material by adding a compound which contains sulfur element to the composite oxide (see patent documents 1 to 5).

Patent document 1 discloses the following. With respect to $Li_xM_yO_2$ synthesized after basic cobalt is obtained by reacting an aqueous cobalt sulfate solution with an aqueous sodium hydrogen carbonate solution, taking out the resultant precipitate by filtration, and water-washing and drying the precipitate, use of the $Li_xM_yO_2$ which contains sulfuric acid radicals ($SO_4$) from a starting material in a specific amount as a positive-electrode active material is effective in preventing the aluminum foil used as a current collector from corroding and in improving battery performances.

Patent document 2 discloses that self-discharge characteristics and storability can be improved by mixing $LiNi_aCo_b$-$M_cO_2$ with $AlX(SO_4)_2.12H_2O$ and heat-treating the mixture to thereby coat the positive-electrode active material with $AlX(SO_4)_2$.

Patent document 3 discloses that safety, discharge capacity, and cycle characteristics can be improved by coating a lithium-transition metal composite oxide having a spinel manganese structure with sulfur by dispersing the lithium-transition metal composite oxide in water, adding a metallic ingredient and sulfur to the dispersion while controlling the pH to form a coating layer through a precipitation reaction, subsequently taking out the particles by filtration, and then drying the particles.

Patent document 4 discloses a technique in which transition metal sources for a lithium-transition metal composite oxide of the $LiNiMnCoO_2$ type are mixed with a sulfur-containing compound and the mixture is burned after addition of a lithium source thereto, thereby producing a lithium-transition metal composite oxide powder having a lowered pH.

Patent document 5 discloses that gas evolution and an increase in internal resistance which occur during high-temperature storage can be inhibited or reduced by mixing a lithium-transition metal composite oxide of the $LiCoO_2$ type with a compound that has a phosphorus or sulfur atom and heat-treating the mixture at 900° C.

PRIOR-ART DOCUMENTS

Patent Documents

Patent Document 1: JP-A-9-245787
Patent Document 2: JP-A-2001-006672
Patent Document 3: JP-A-2003-297360
Patent Document 4: JP-A-2006-172753
Patent Document 5: JP-A-2007-335331

SUMMARY OF THE INVENTION

Problems that the Invention is to Solve

However, since the degrees of the cost reduction, voltage increase, and safety vary depending on composition, it is necessary to select and use a composite oxide within a limited composition range, for example, a composite oxide having a manganese/nickel atomic ratio regulated to about 1 or greater or a composite oxide having a reduced cobalt proportion, in order to satisfy requirements for a further cost reduction, use at a higher set upper-limit voltage, and higher safety. However, a lithium secondary battery in which a lithium-nickel-manganese-cobalt composite oxide having a composition within such a range is used as a positive-electrode material is reduced in load characteristics, such as rate/output characteristics, and in low-temperature output characteristics, and further improvements have hence been necessary for putting the battery to practical use.

With respect to patent document 1, since a lithium source, transition metal sources, and a compound represented by a structural formula which contains a sulfur atom are used without being pulverized, sulfur atoms are less apt to evenly come into the secondary particles. It is hence difficult to attain a cost reduction and an improvement in battery performance, which are purposes of the present invention.

With respect to patent document 2 and patent document 3, a lithium-transition metal composite oxide is mixed with a sulfur-containing compound and the mixture is heat-treated at a low temperature of 500° C. or below. Because of this, sulfur atoms cannot come into the secondary particles. In addition, since the sulfur-containing compound is mixed after the lithium-transition metal composite oxide has been synthesized, it is impossible to improve powder properties. Namely, it is difficult to accomplish a purpose of the present invention.

With respect to patent document 4, the technique disclosed therein is for obtaining a lithium-transition metal composite oxide powder having a lowered pH by mixing transition metal sources with a sulfur-containing compound, spray-drying the mixture, subsequently further mixing a lithium source, and heat-treating the resultant mixture at a high temperature. However, since a lithium source is mixed after the spray drying and the mixture is heat-treated at a high temperature, the resultant powder has a small specific surface area. Furthermore, the document includes no statement concerning an increase in specific surface area due to the addition of a sulfur-containing compound. In addition, patent document 4 includes no statement concerning any expedient for inhibiting specific surface area from being reduced by such high-temperature burning.

With respect to patent document 5, a lithium-transition metal composite oxide is mixed with a sulfur- or phosphorus-containing compound and the mixture is heat-treated at 900° C. to thereby deposit the sulfur- or phosphorus-containing compound on the surface of particles of the lithium-transition metal composite oxide. However, since a sulfur-containing compound is mixed after the lithium-transition metal composite oxide has been synthesized, it is impossible to improve powder properties. Namely, it is difficult to accomplish a purpose of the present invention.

Under these circumstances, the present inventors diligently made investigations on the basis of an idea that it is important, for accomplishing the subject of improving load characteristics such as rate/output characteristics, that an active material which is being burned should have sufficiently high crystallinity and, despite this, particles should be obtained in which inner parts of the secondary particles are porous. As a result, the inventors found that the desired lithium-transition metal compound powder is obtained especially with respect to a lamellar lithium-nickel-manganese-cobalt composite oxide by a production process which includes simultaneously pulverizing starting materials for main components in a liquid medium to obtain a slurry in which the starting materials have been evenly dispersed, spray-drying the slurry, and burning the spray-dried material. This powder, when used as a positive-electrode material for lithium secondary batteries, makes it possible to attain not only a cost reduction, an improvement in high-voltage resistance, and higher safety but also an improvement in load characteristics such as rate and output characteristics. In this case, however, the powder has undergone a change in property, i.e., a decrease in specific surface area. The inventors hence encountered a new problem that the battery has a reduced discharge capacity at a high current density.

An object of the invention is to provide a positive-electrode active material for lithium secondary batteries which has an increased specific surface area while retaining an intact bulk density and, hence, which when used as a lithium-secondary-battery positive-electrode material, attains a cost reduction and an increase in capacity and makes it possible to obtain a lithium secondary battery which is highly safe and has excellent performances.

Means for Solving the Problems

The present inventors diligently made investigations in order to optimize specific surface area without reducing bulk density. As a result, the inventors have found that a lithium-containing transition metal compound powder which brings about excellent battery performances can be obtained without impairing the improving effects described above, by burning a compound represented by a structural formula that contains at least one element selected from the Group-16 elements belonging to the third or later periods of the periodic table (hereinafter referred to as "additive element 1"), in particular, sulfur element, and starting materials for the lithium-containing transition metal compound at a temperature not lower than a given temperature.

Namely, the invention relates to the positive-electrode materials for lithium secondary batteries, process for producing the materials, positive electrode for lithium secondary batteries, and lithium secondary battery which are described below.

(1)

A lithium-transition metal compound powder for a positive-electrode material of lithium secondary batteries, which is a powder that comprises a lithium-transition metal compound having a function of being capable of an insertion and elimination of lithium ions, wherein the particles in the powder contain, in the inner part thereof, a compound that, when analyzed by an SEM-EDX method, has peaks derived from at least one element selected from the Group-16 elements belonging to the third or later periods of the periodic table and at least one element selected from the Group-5 to Group-7 elements belonging to the fifth and sixth periods of the periodic table.

(2)

The lithium-transition metal compound powder for a positive-electrode material of lithium secondary batteries according to the item (1) above, wherein the lithium-transition metal compound is a powder containing secondary particles each constituted of primary particles that have two or more compositions, and the secondary particles include, in at least the inner part thereof, primary particles of a compound that, when analyzed by an SEM-EDX method, has peaks derived from at least one element selected from the Group-16 elements belonging to the third or later periods of the periodic table and at least one element selected from the Group-5 to Group-7 elements belonging to the fifth and sixth periods of the periodic table.

(3)

A lithium-transition metal compound powder for a positive-electrode material of lithium secondary batteries, which comprises a lithium-transition metal compound having a function of being capable of an insertion and elimination of lithium ions, and which is obtained by pulverizing and mixing a lithium source and a transition metal source, the lithium source and the transition metal source serving as starting materials for the lithium-transition metal compound, and a compound having, in the structural formula, at least one element selected from the Group-16 elements belonging to the third or later periods of the periodic table, and then burning the mixture.

(4)

A lithium-transition metal compound powder for a positive-electrode material of lithium secondary batteries, which comprises a lithium-transition metal compound having a function of being capable of an insertion and elimination of lithium ions, and which is obtained by adding a compound that has at least one element selected from the Group-16 elements belonging to the third or later periods of the periodic table and a compound that has at least one element selected from the Group-5 to Group-7 elements belonging to the fifth and sixth periods of the periodic table to a starting material for the lithium-transition metal compound, and then burning the mixture.

(5)

The lithium-transition metal compound powder for a positive-electrode material of lithium secondary batteries according to any one of the items (1) to (4) above, wherein the at least one element selected from the Group-16 elements belonging to the third or later periods of the periodic table is at least one element selected from the group consisting of S, Se, Te, and Po.

(6)

The lithium-transition metal compound powder for a positive-electrode material of lithium secondary batteries according to any one of the items (1) to (5) above, wherein the at least one element selected from the Group-5 to Group-7 elements belonging to the fifth and sixth periods of the periodic table is at least one element selected from the group consisting of Mo, W, Nb, Ta, and Re.

(7)

The lithium-transition metal compound powder for a positive-electrode material of lithium secondary batteries according to any one of the items (1) to (6) above, wherein the lithium-transition metal compound gives a pore distribution curve which has a peak at a pore radius of 80 nm or larger but less than 800 nm.

(8)

The lithium-transition metal compound powder for a positive-electrode material of lithium secondary batteries according to any one of the items (2) to (7) above, wherein the molar ratio of the sum of S, Se, Te and Po elements to the sum of the metallic elements other than Li, S, Se, Te, Po, Mo, W, Nb, Ta and Re elements in surface parts of the secondary particles is not more than 500 times the molar ratio in the whole secondary particles.

(9)

The lithium-transition metal compound powder for a positive-electrode material of lithium secondary batteries according to any one of the items (2) to (8) above, wherein the molar ratio of the sum of Mo, W, Nb, Ta, and Re elements to the sum of the metallic elements other than Li, S, Se, Te, Po, Mo, W, Nb, Ta, and Re elements in surface parts of the secondary particles is not less than 1.05 times the molar ratio in the whole secondary particles.

(10)

The lithium-transition metal compound powder for a positive-electrode material of lithium secondary batteries according to any one of the items (1) to (9) above, which has a BET specific surface area of 0.5-3 $m^2/g$.

(11)

The lithium-transition metal compound powder for a positive-electrode material of lithium secondary batteries according to any one of the items (1) to (10) above, which has a bulk density of 1.2-2.8 $g/cm^3$.

(12)

The lithium-transition metal compound powder for a positive-electrode material of lithium secondary batteries according to any one of the items (1) to (11) above, wherein the lithium-transition metal compound is a lithium-nickel-manganese-cobalt composite oxide having a lamellar structure or a lithium-manganese composite oxide having a spinel structure.

(13)

The lithium-transition metal compound powder for a positive-electrode material of lithium secondary batteries according to the item (12) above, which has a composition represented by the following composition formula (A) or (B):

$$Li_{1+x}MO_2 \tag{A}$$

wherein, x is 0 to 0.5, M is an element configured of Li, Ni and Mn or of Li, Ni, Mn and Co, the Mn/Ni molar ratio being 0.1-5, the Co/(Mn+Ni+Co) molar ratio being 0-0.35, and the molar ratio of Li to M being 0.001-0.2, $$Li[Li_aM'_bMn_{2-b-a}]O_{4+\delta} \tag{B}$$

wherein, a, b, and δ satisfy 0≤a≤0.3, 0.4≤b≤0.6, and −0.5≤δ≤0.5, and M' represents at least one transition metal selected from Ni, Cr, Fe, Co and Cu.

(14)

The lithium-transition metal compound powder for a positive-electrode material of lithium secondary batteries according to any one of the items (1) to (13) above, which is obtained by a burning conducted under an oxygen-containing gas atmosphere at a burning temperature of 1,000° C. or higher.

(15)

The lithium-transition metal compound powder for a positive-electrode material of lithium secondary batteries according to any one of the items (1) to (14) above, which is obtained by further adding both a compound that contains at least one element selected from Mo, W, Nb, Ta and Re and a compound that contains at least one element selected from B and Bi, and then burning the mixture.

(16)

A process for producing a lithium-transition metal compound powder for a positive-electrode material of lithium secondary batteries, which comprises: a step of pulverizing a lithium compound, at least one transition metal compound selected from Mn, Co and Ni compounds, and a compound that contains at least one element selected from the Group-16 elements belonging to the third or later periods of the periodic table in a liquid medium, to prepare a slurry that contains these compounds evenly dispersed therein; a spray drying step of spray-drying the slurry; and a burning step of burning the resultant spray-dried material.

(17)

The process for producing a lithium-transition metal compound powder for a positive-electrode material of lithium secondary batteries according to the item 16, above wherein in the slurry preparation step, the lithium compound, the transition metal compound, and the compound that contains at least one element selected from the Group-16 elements belonging to the third or later periods of the periodic table are pulverized in a liquid medium until the resultant particles come to have a median diameter, as determined under the following conditions, of 0.6 μm or less, and in the spray drying step, the spray drying is conducted under conditions that satisfy 50 cP≤V≤7,000 cP and 500≤G/S≤10,000, in which V (cP) is a viscosity of the slurry being subjected to the spray drying, S (L/min) is a slurry feed rate, and G (L/min) is a gas feed rate:

Conditions for median diameter determination are as follows:
  i) an ultrasonic dispersion treatment is conducted at an output of 30 W and a frequency of 22.5 kHz for 5 minutes and
  ii) the dispersion is thereafter examined for median diameter, in terms of volume-based particle diameter, by means of a laser diffraction/scattering type particle size distribution analyzer setting a refractive index to 1.24.

(18)

The process for producing a lithium-transition metal compound powder for a positive-electrode material of lithium secondary batteries according to the item 16 or 17 above, wherein the transition metal compound at least comprises a nickel compound, a manganese compound and a cobalt compound, and in the burning step, the spray-dried material is burned at 1,000° C. or higher under an oxygen-containing gas atmosphere.

(19)

The process for producing a lithium-transition metal compound powder for a positive-electrode material of lithium secondary batteries according to any one of the items (16) to (18) above, wherein the lithium compound is lithium carbonate.

(20)

A positive electrode for lithium secondary batteries which comprises a positive-electrode active-material layer and a current collector, the positive-electrode active-material layer comprising: the lithium-transition metal compound powder for a positive-electrode material of lithium secondary batteries according to any one of the items (1) to (15) above; and a binder.

(21)

A lithium secondary battery, which comprises a negative electrode that is capable of occluding and releasing lithium, a nonaqueous electrolyte that contains a lithium salt, and a positive electrode that is capable of occluding and releasing lithium, wherein the positive electrode is the positive electrode for lithium secondary batteries according to the item (20) above.

Effects of the Invention

The positive-electrode active materials for lithium secondary batteries of the invention have an increased specific surface area while retaining an intact bulk density, and are hence capable of attaining a cost reduction and an increase in capacity when used as positive-electrode materials for lithium secondary batteries. Consequently, a lithium secondary battery which is inexpensive and has excellent performances is provided according to the invention.

MODES FOR CARRYING OUT THE INVENTION

Figure 1:
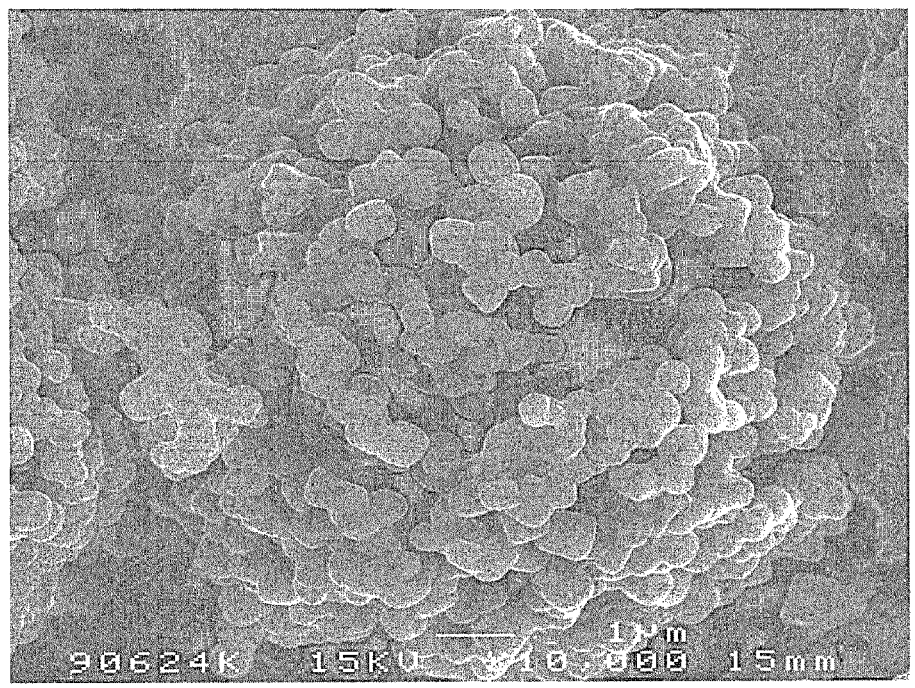
FIG. 1 is an SEM image (photograph) of the lithium-nickel-manganese-cobalt composite oxide powder produced in Example 1.
Figure 2:
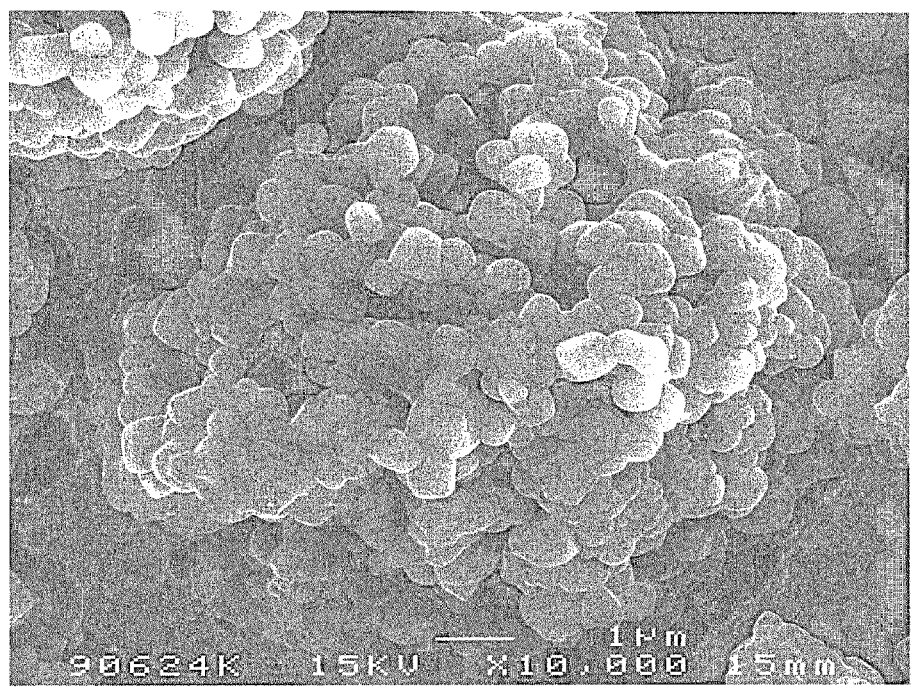
FIG. 2 is an SEM image (photograph) of the lithium-nickel-manganese-cobalt composite oxide powder produced in Example 2.
Figure 3:
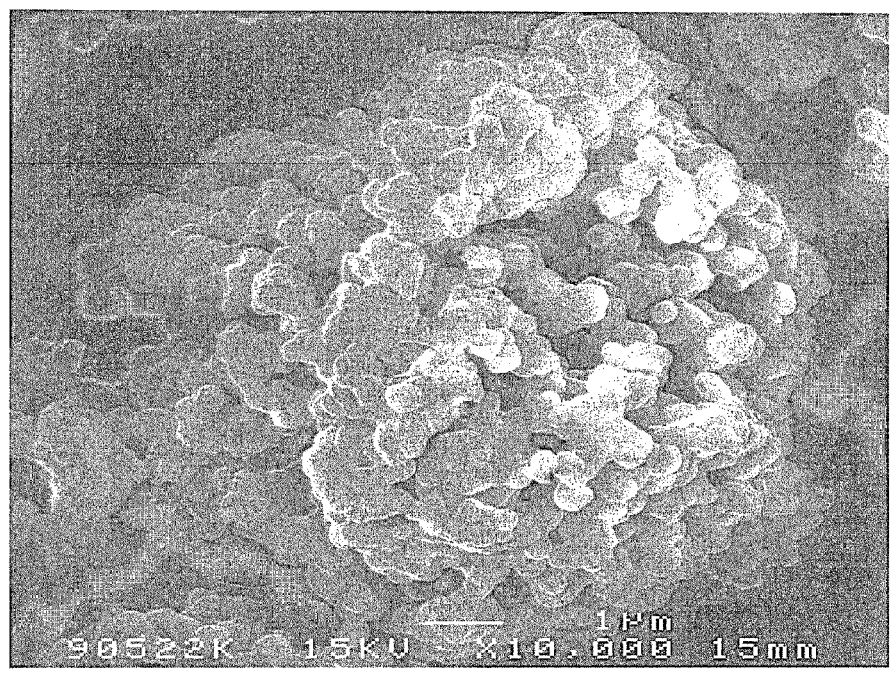
FIG. 3 is an SEM image (photograph) of the lithium-nickel-manganese-cobalt composite oxide powder produced in Comparative Example 1.
Figure 4:
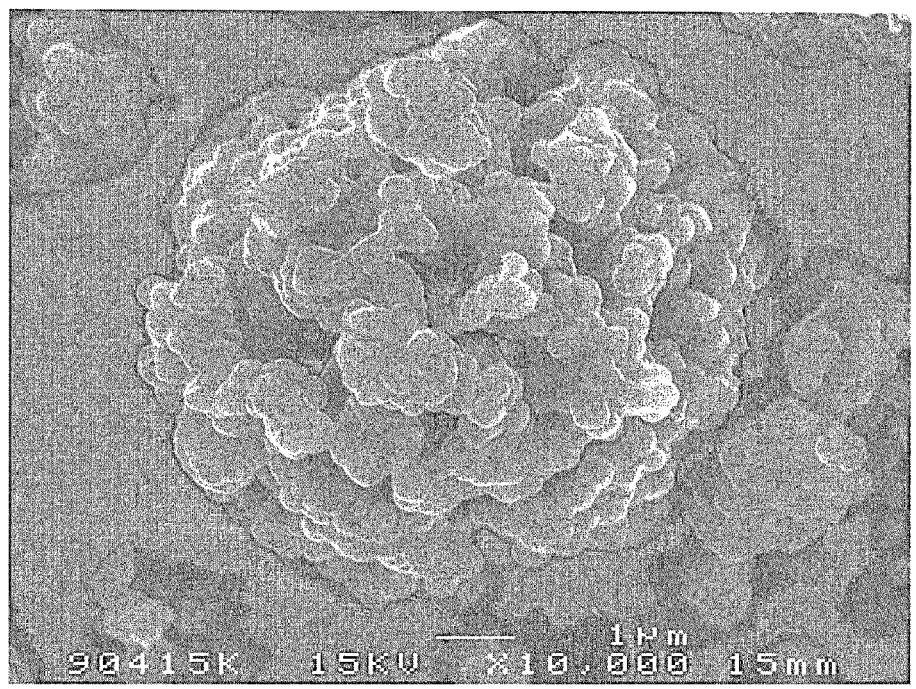
FIG. 4 is an SEM image (photograph) of the lithium-nickel-manganese-cobalt composite oxide powder produced in Comparative Example 2.
Figure 5:
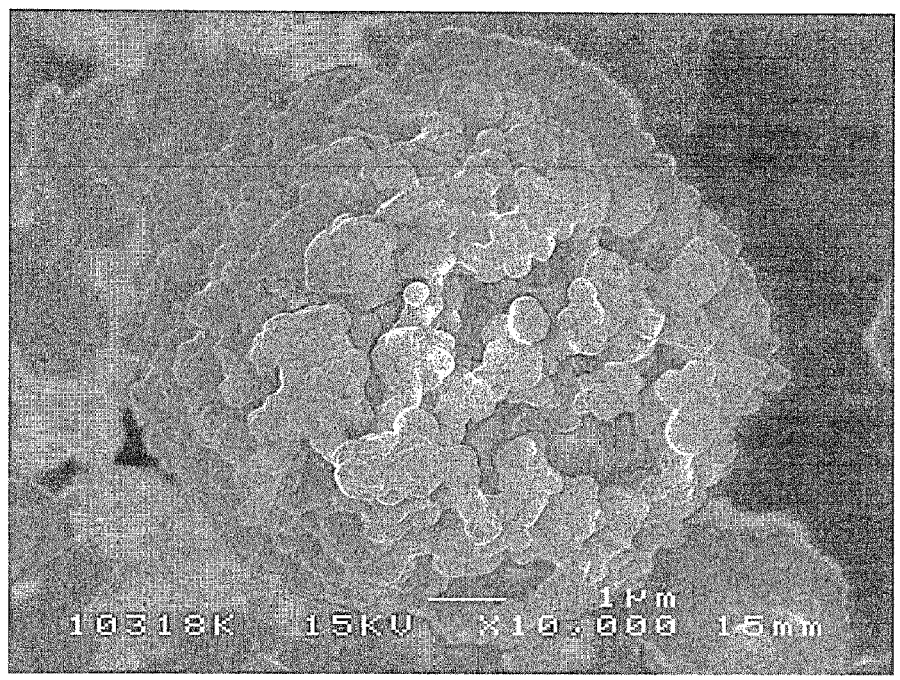
FIG. 5 is an SEM image (photograph) of the lithium-nickel-manganese-cobalt composite oxide powder produced in Example 3.
Figure 6:
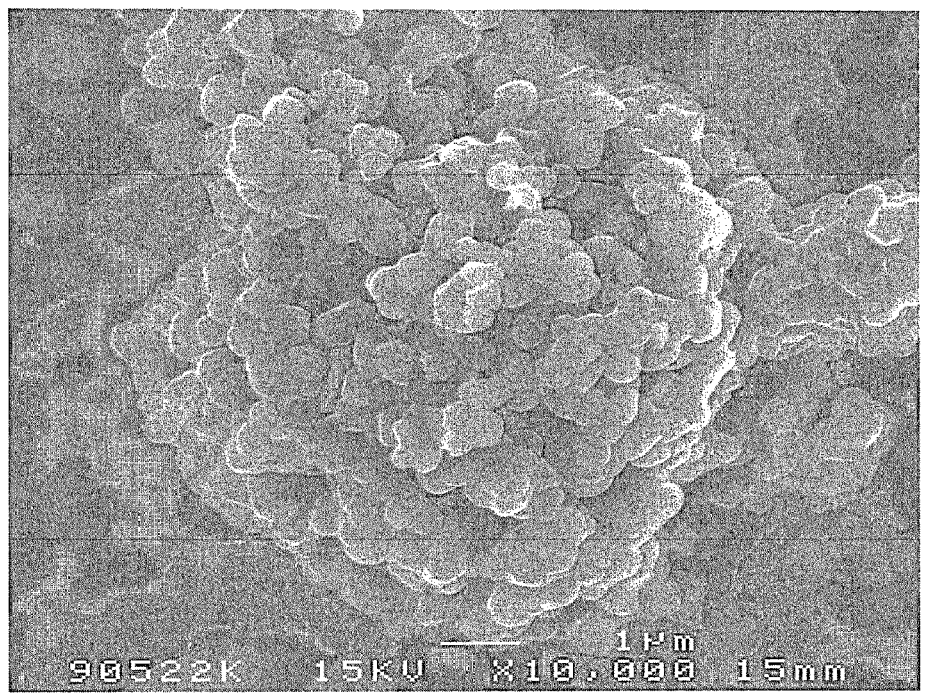
FIG. 6 is an SEM image (photograph) of the lithium-nickel-manganese-cobalt composite oxide powder produced in Comparative Example 3.

Embodiments of the invention will be explained below in detail. However, the following explanations on constituent elements are for embodiments (representative embodiments) of the invention, and the invention should not be construed as being limited to the embodiments unless the invention departs from the spirit thereof.

The expressions "% by weight", "weight ppm", and "parts by weight" have the same meanings as "% by mass", "mass ppm", and "parts by mass", respectively.

[Lithium-Transition Metal Compound Powders]

The positive-electrode active materials of the invention are as follows.

(1) A lithium-transition metal compound powder for a positive-electrode material of lithium secondary batteries, which is a powder that comprises a lithium-transition metal compound having the function of being capable of insertion and elimination of lithium ions, the powder being composed of particles which contain, in the inner part thereof, a compound that, when analyzed by an SEM-EDX method, has peaks derived from at least one element selected from the Group-16 elements belonging to the third or later periods of the periodic table (the at least one element is hereinafter referred to also as "additive element 1 according to the invention") and at least one element selected from the Group-5 to Group-7 elements belonging to the fifth and sixth periods of the periodic table (the at least one element is hereinafter referred to also as "additive element 2 according to the invention").

(2) A lithium-transition metal compound powder for a positive-electrode material of lithium secondary batteries, which comprises a lithium-transition metal compound having the function of being capable of insertion and elimination of lithium ions and which is obtained by pulverizing and mixing a lithium source and a transition metal source, the lithium source and the transition metal source serving as starting materials for the lithium-transition metal compound, and a compound having a structural formula which has at least one element selected from the Group-16 elements belonging to the third or later periods of the periodic table (additive element 1 according to the invention), and burning the mixture. (3) A lithium-transition metal compound powder for a positive-electrode material of lithium secondary batteries, which comprises a lithium-transition metal compound having the function of being capable of insertion and elimination of lithium ions and which is obtained by adding a compound that has at least one element selected from the Group-16 elements belonging to the third or later periods of the periodic table (additive element 1 according to the invention) and a compound that has at least one element selected from the Group-5 to Group-7 elements belonging to the fifth and sixth periods of the periodic table (additive element 2 according to the invention) to starting materials for the lithium-transition metal compound, and burning the mixture.

<Lithium-Containing Transition Metal Compounds>

The term lithium-transition metal compound used in the invention means a compound which has a structure capable of elimination and insertion of lithium ions. Examples thereof include sulfides, phosphoric acid salt compounds, and lithium-transition metal composite oxides. Examples of the sulfides include compounds having a two-dimensional lamellar structure, such as $TiS_2$ and $MoS_2$, and Chevrel compounds which have a strong three-dimensional framework structure represented by the general formula $Me_xMo_6S_8$ (Me is various transition metals including Pb, Ag, and Cu). Examples of the phosphoric acid salt compounds include phosphoric acid salt compounds that belong to an olivine structure, which are generally represented by $LiMePO_4$ (Me is at least one transition metal). Specific examples thereof include $LiFePO_4$, $LiCoPO_4$, $LiNiPO_4$, and $LiMnPO_4$. Examples of the lithium-transition metal composite oxides include lithium-transition metal composite oxides that belong to a spinel structure in which three-dimensional diffusion is possible or to a lamellar structure which renders two-dimensional diffusion of lithium ions possible. The composite oxides having a spinel structure are generally represented by $LiMe_2O_4$ (Me is at least one transition metal), and specific examples thereof include $LiMn_2O_4$, $LiCoMnO_4$, $LiNi_{0.5}Mn_{1.5}O_4$, and $LiCoVO_4$.

The composite oxides having a lamellar structure are generally represented by $LiMeO_2$ (Me is at least one transition metal), and specific examples thereof include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$, and $LiMnO_2$.

It is preferred, from the standpoint of lithium ion diffusion, that the lithium-transition metal compound powders of the invention should have an olivine structure, a spinel structure, or a lamellar structure. Preferred of these are lithium-transition metal compound powders which have a lamellar structure or a spinel structure from the standpoint that the crystal lattice of each of these compounds undergoes sufficient expansion and contraction with charge/discharge to enable the effects of the invention to be produced remarkably. Especially preferred of these are the powders having a lamellar structure.

The lithium-transition metal compound powders of the invention may contain other elements introduced thereinto. The other elements are selected from any one or more of B, Na, Mg, Al, K, Ca, Ti, V, Cr, Fe, Cu, Zn, Sr, Y, Zr, Nb, Ru, Rh, Pd, Ag, In, Sn, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, Cl, Br, and I. These other elements may have been incorporated into the crystal structure of the lithium-nickel-manganese-cobalt composite oxide. Alternatively, the other elements may localize in the elemental form or as a compound, for example, on the surface of the particles or at the crystal grain boundaries without being incorporated into the crystal structure of the lithium-nickel-manganese-cobalt composite oxide.

In the invention, it is preferred that most of the "additive element 1 according to the invention" or "additive element 2 according to the invention" should be present in the surface of the secondary particles, but some of the additive element 1 or 2 may have been incorporated as a substituent into transition metal layers. In the case where the "additive element 1 according to the invention" or "additive element 2 according to the invention" has been incorporated as a substituent into transition metal layers, this lithium-transition metal compound includes a compound in which the basic framework of the lithium-transition metal has been thus partly substituted, even when the basic framework is expressed by the general formula (I) which will be described later.

<Compound which, when Analyzed by SEM-EDX Method, has Peaks Derived from at Least One Element Selected from Group-16 Elements Belonging to Third or Later Periods of Periodic Table (Additive Element 1 According to the Invention) and at Least One Element Selected from Group-5 to Group-7 Elements Belonging to Fifth and Sixth Periods of Periodic Table (Additive Element 2 According to the Invention)>

One of the lithium-transition metal compound powders of the invention for use as positive-electrode materials for lithium secondary batteries (hereinafter referred to also as "lithium-transition metal compound powders of the invention") is a powder which comprises a lithium-transition metal compound having the function of being capable of insertion and elimination of lithium ions, and which is characterized by being composed of particles which have, in the inner part thereof, a compound that, when analyzed by an SEM-EDX method, has peaks derived from at least one element selected from the Group-16 elements belonging to the third or later periods of the periodic table (additive element 1 according to the invention) and at least one element selected from the Group-5 to Group-7 elements belonging to the fifth and sixth periods of the periodic table (additive element 2 according to the invention). It is preferred that this lithium-transition metal compound should be a powder composed of secondary particles each constituted of primary particles of lithium-transition metal compounds that have two or more compositions, wherein the secondary particles have, in at least inner parts thereof, primary particles of a compound that, when analyzed by an SEM-EDX method, has peaks derived from at least one element selected from the Group-16 elements belonging to the third or later periods of the periodic table (additive element 1 according to the invention) and at least one element selected from the Group-5 to Group-7 elements belonging to the fifth and sixth periods of the periodic table (additive element 2 according to the invention).

Figure 9:
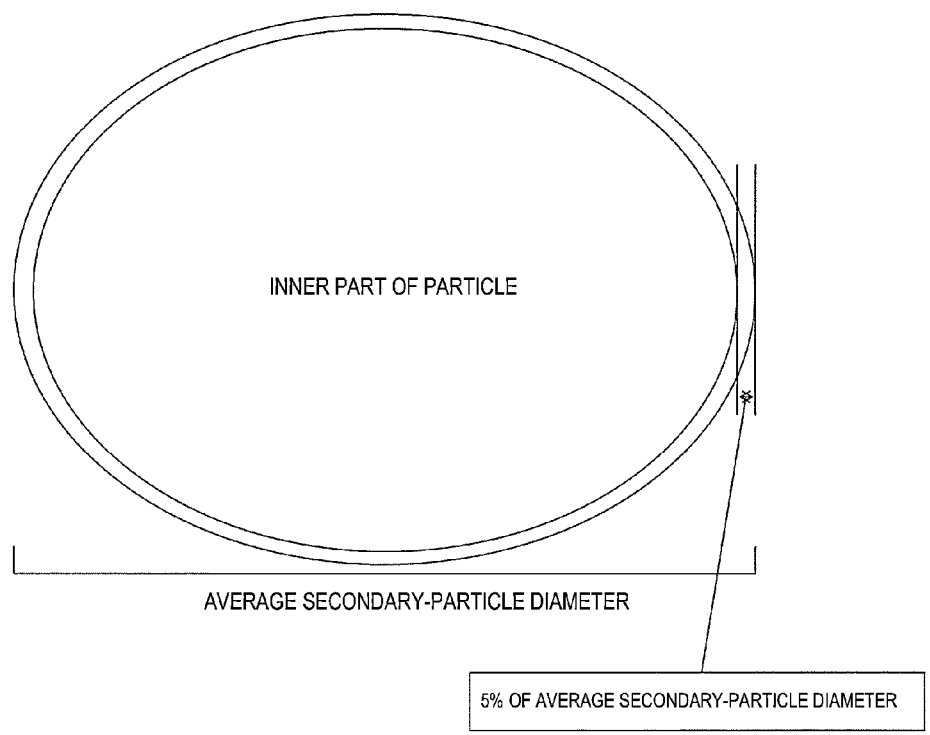
FIG. 9 is a diagrammatic view concerning the "inner part of a particle" according to the invention.

The term "inner part of a secondary particle" herein has the following meaning. In the structure of a secondary particle formed by aggregation of primary particles, the term means that part of the secondary particle which is located inside the surface region that ranges from the periphery of the secondary particle to a depth which is 5% of the average particle diameter of the secondary particles, as shown in FIG. 9.

That particles of a compound which, when analyzed by an SEM-EDX method, has peaks derived from the "additive element 1 according to the invention" and "additive element 2 according to the invention" are present in the inner part of a particle can be ascertained, for example, by producing a cross-section of the secondary particle by means of a cross-section polisher or the like, examining the cross-section with an SEM or TEM, and further analyzing the cross-section with an EDX (energy dispersive X-ray analyzer). Thus, the presence of a compound which, when analyzed by an SEM-EDX method, has peaks derived from the "additive element 1 according to the invention" and "additive element 2 according to the invention" can be ascertained.

With respect to crystallinity, whether a particle has crystallinity or not can be determined by examining the same particle as that particle with an XRD or TEM. Specifically, in the case of an XRD, when peaks of a compound having the "additive element 1 according to the invention" and "additive element 2 according to the invention" which show crystallinity corresponding to that of $Li_2SO_4$, $LiHSO_4$, $Li_2SeO_4$, $Li_2TeO_4$, $Li_2TeO_3$, $Li_2Te_2O_5$, or the like can be observed, this compound can be regarded as crystalline. In the case where the concentration of the "additive element 1 according to the invention" or "additive element 2 according to the invention" is too low to conduct analysis with an XRD, this compound can be regarded as crystalline when spots assigned to a crystalline compound can be observed in an examination with a TEM.

<Degree of Surface Concentration of "Additive Element 1 According to the Invention" or "Additive Element 2 According to the Invention">

It is more preferred that in the lithium-transition metal compound powders of the invention, the element(s) derived from additive 1 according to the invention, i.e., at least one element selected from the Group-16 elements belonging to the third or later periods of the periodic table (additive element 1 according to the invention), should have concentrated in the surface parts of the primary particles thereof. Specifically, the molar ratio of the sum of the additive elements to the sum of the metallic elements other than both lithium and the additive elements (i.e., the metallic elements other than both lithium and the additive elements) in the surface parts of the primary particles is usually preferably at least 1 time the molar ratio in the whole particles. The lower limit of that ratio is more preferably 1.05 times or more, even more preferably 1.1 time or more, especially preferably 2 times or more. There is usually no particular upper limit on that molar ratio. However, the molar ratio is preferably 500 times or less, more preferably 300 times or less, especially preferably 100 times or less, most preferably 50 times or less. When that ratio is too small, there are cases where the effect of improving powder properties is lessened. Conversely, when that ratio is too large, there are cases where a deterioration in battery performance results.

Furthermore, it is more preferred that in the lithium-transition metal compound powders of the invention, the element(s) derived from additive 2 according to the invention, i.e., at least one element selected from the Group-5 to Group-7 elements belonging to the fifth and sixth periods of the periodic table (additive element 2 according to the invention), should have concentrated in the surface parts of the primary particles thereof. Specifically, the molar ratio of the sum of the additive elements to the sum of the metallic elements other than both lithium and the additive elements (i.e., the metallic elements other than both lithium and the additive elements) in the surface parts of the primary particles is usually preferably at least 1 time the molar ratio in the whole particles. The lower limit of that ratio is more preferably 1.05 times or more, even more preferably 1.1 time or more, especially preferably 2 times or more. There is usually no particular upper limit on that molar ratio. However, the molar ratio is preferably 200 times or less, more preferably 100 times or less, especially preferably 30 times or less, most preferably 15 times or less. When that ratio is too small, there are cases where the effect of improving powder properties is lessened. Conversely, when that ratio is too large, there are cases where a deterioration in battery performance results.

The surface parts of primary particles of a lithium-transition metal compound powder can be analyzed for composition, for example, by X-ray photoelectron spectroscopy (XPS) using monochromatic AlKα as an X-ray source under the conditions of an analysis area of 0.8 mm in diameter and a pickup angle of 45°. The range (depth) where the analysis is possible is generally 0.1-50 nm, although the range varies depending on the composition of the primary particles. In particular, in the case of positive-electrode active materials, that range is generally 1-10 nm. Consequently, in the invention, the term "surface parts of the primary particles of a lithium-transition metal compound powder" means a range in which the composition can be determined under those conditions.

<Compound Represented by Structural Formula Having Additive Element 1 According to the Invention>

The lithium-transition metal compound powders of the invention contain a lithium-transition metal compound as the main component. One of the lithium-transition metal compound powders of the invention is characterized by being obtained by pulverizing and mixing a lithium source and a transition metal source, which are starting materials for the main component, and a compound (hereinafter referred to also as "additive 1 according to the invention") represented by a structural formula which contains at least one element selected from the Group-16 elements belonging to the third or later periods of the periodic table (additive element 1 according to the invention), and then burning the mixture. Consequently, the compound represented by a structural formula which contains a sulfur atom has been incorporated into the lithium-transition metal compound.

Additive element 1 according to the invention is not particularly limited so long as the additive element 1 is at least one element selected from the Group-16 elements belonging to the third or later periods. It is, however, preferred that the additive element 1 should be at least one element selected from the group consisting of S, Se, Te, and Po. The additive element 1 more preferably is S and/or Se from the standpoint that these elements are light elements, and most preferably is S.

In the invention, the compound having the element accelerates the growth of active-material particles, for example, by accelerating the sintering which occurs among the primary particles or secondary particles of the positive-electrode active material during high-temperature burning. The compound hence has the effect of yielding a powder which has the property of being high in specific surface area, while attaining an increase in crystallinity.

For example, when a lithium-nickel-manganese-cobalt composite oxide powder having a composition within the range specified by the composition formula (A) or (B) that will be described later, which is suitable for the invention, is produced by a production process including simultaneously pulverizing starting materials for the main component in a liquid medium to obtain a slurry in which the starting materials have been evenly dispersed, spray-drying the slurry, and burning the spray-dried material, then the burning which is conducted at a high temperature results in an increase in density and a decrease in specific surface area. These changes lead to a decrease in high-current-density discharge capacity.

Namely, it is extremely difficult to improve both properties. However, this trade-off relationship can be overcome, for example, by adding a "compound represented by a structural formula which contains additive element 1" according to the invention ("additive 1 according to the invention")" and burning the mixture.

The additive 1 according to the invention has a feature that the melting point of this additive is not higher than the burning temperature and this additive, during the burning, melts but does not form a solid solution. Furthermore, since the additive element 1 has a smaller ionic radius than transition metals, it is thought that few atoms thereof are incorporated as a substituent into the transition metal layers. Consequently, although the additive 1 according to the invention functions as a sintering aid during the burning, this additive forms primary particles without forming a solid solution in the lithium-transition metal composite oxide in the secondary particles. This additive therefore is presumed to have the effects according to the invention described above. The additive 1 is preferred from the standpoint of the advantages of being inexpensively available as an industrial starting material and being a light element, among those effects.

The mechanism by which a specific compound added as additive 1 according to the invention has the effect of accelerating particle growth and sintering during the burning in the invention has not been elucidated. However, the fact that an additive 1, which contained additive element 1, produced the effects in the Examples indicates that this element, which differs from each of the cation elements constituting the lithium-transition metal compound, rarely forms a solid solution through a solid-phase reaction and, as a result, comes to localize in the surface of or at the boundaries of the lithium-transition metal compound particles. It is presumed that the additive element 1 consequently served to lower the surface energy of the positive-electrode active-material particles to accelerate particle growth and sintering. In addition, it is presumed that the additive element 1 lowers the volume resistivity of the powder and thereby improves the load characteristics of the battery.

The kind of additive 1, which contains additive element 1 according to the invention, is not particularly limited so long as the additive 1 produces the effects of the invention. However, preferred compounds which have sulfur element include inorganic salts represented by $Me(NH_4)_x(SO_4)_y \cdot nH_2O$ (Me is a cation element), e.g., $Na_2SO_4$, $Li_2SO_4$, $ZnSO_4$, $Al_2(SO_4)_3$, $Sb_2(SO_4)_3$, $Y_2(SO_4)_3$, $CaSO_4$, $SnSO_4$, $SrSO_4$, $Ce_2(SO_4)_3$, $TiO(SO_4)$, $FeSO_4$, $Fe_2(SO_4)_3$, $CuSO_4$, $BaSO_4$, $Bi_2(SO_4)_3$, $MgSO_4$, $EuSO_4$, and $La_2(SO_4)_3$, and organic salts such as tetrabutylammonium hydrogen sulfate, trifluoromethanesulfonic acid, 1-naphthylamine-2-sulfonic acid, 1-naphthylamine-5-sulfonic acid, 1-naphthol-3,6-disulfonic acid, p-bromobenzenesulfonic acid, p-anilinesulfonic acid, o-xylene-4-sulfonic acid, dimethyl sulfone, o-sulfobenzoic acid, and 5-sulfosalicyclic acid. Preferred of these are inorganic salts such as $Na_2SO_4$, $Li_2SO_4$, $ZnSO_4$, $Al_2(SO_4)_3$, $Bi_2(SO_4)_3$, and $TiO(SO_4)$ because $CO_2$ generation during burning is only slight when these salts are used. $Na_2SO_4$ and $Li_2SO_4$ are especially preferred because these salts are industrially available at low cost and are water-soluble.

Examples of compounds which have selenium element include oxides such as $H_2SeO_4$ and $SeO_2$, halogen compounds such as $SeF_4$ and $SeCl_2$, and selenium oxychloride. Preferred of these are the oxides because generation of gases such as $CO_2$ and $F_2$ is only slight when the oxides are used. Especially preferred is $SeO_2$.

Examples of compounds which have tellurium element include oxides such as TeO, $TeO_2$, and $H_2TeO_3$ and halides such as $TeF_6$, $TeCl_4$, and $TeBr_4$. Preferred of these are the oxides because generation of gases such as $CO_2$ and $F_2$ is only slight when the oxides are used. Especially preferred is $TeO_2$.

One of these additives 1 may be used alone, or two or more thereof may be used in combination.

The range of the addition amount of additive 1 according to the invention, based on the total weight of the starting materials for constituting the main component, is generally 0.001% by mole or more, preferably 0.01% by mole or more, more preferably 0.1% by mole or more, even more preferably 0.3% by mole or more, especially preferably 0.5% by mole or more, and is generally 10% by mole or less, preferably 5% by mole or less, more preferably 3% by mole or less, especially preferably 2% by mole or less. In case where the amount thereof is less than the lower limit, there is the possibility that it might be impossible to obtain the effects. In case where the amount thereof exceeds the upper limit, there is the possibility of resulting in a decrease in battery performance.

<Compound Represented by Structural Formula Having Additive Element 2 According to the Invention>

In the invention, a compound (additive 2 according to the invention) which contains, as other additive element(s), at least one element selected from the Group-5 to Group-7 elements belonging to the fifth or sixth period of the periodic table (additive element 2 according to the invention) may be used besides the compound (additive 1 according to the invention) represented by a structural formula which contains at least one element selected from the Group-16 elements belonging to the third or later periods of the periodic table (additive element 1 according to the invention). It is preferred that additive element 2 according to the invention should be at least one element selected from the group consisting of Mo, W, Nb, Ta, and Re, among those elements usable as additive element 2 according to the invention, from the standpoint that these elements are highly effective. Additive element 2 more preferably is Mo or W, and most preferably is W.

The kind of the compound (additive 2 according to the invention) which contains additive element 2 according to the invention is not particularly limited so long as the compound produces the effects of the invention. Usually, however, an oxide of additive element 2 is used. It is preferred that additive element 2 should be at least one element selected from the group consisting of Mo, W, Nb, Ta, and Re.

Examples of compounds usable as additive 2 are as follows. Examples of compounds having molybdenum element include MoO, $MoO_2$, $MoO_3$, $MoO_x$, $Mo_2O_3$, $Mo_2O_5$, and $Li_2MoO_4$. Examples of compounds having tungsten element include WO, $WO_2$, $WO_3$, $H_2WO_4$, $WO_x$, $W_2O_3$, $W_2O_5$, $W_{18}O_{49}$, $W_{20}O_{58}$, $W_{24}O_{70}$, $W_{25}O_{73}$, $W_{40}O_{118}$, $Li_2WO_4$, ammonium metatungstate, and ammonium paratungstate. Examples of compounds having niobium element include NbO, $NbO_2$, $Nb_2O_3$, $Nb_2O_5$, $Nb_2O_5 \cdot nH_2O$, and $LiNbO_3$. Examples of compounds having tantalum element include $Ta_2O$, $Ta_2O_5$, and $LiTaO_3$. Examples of compounds having rhenium element include $ReO_2$, $ReO_3$, $Re_2O_3$, and $Re_2O_7$. Of these, $MoO_3$, $Li_2MoO_4$, $WO_3$, and $Li_2WO_4$ are preferred from the standpoint that these compounds are relatively easily available as industrial starting materials or contain lithium. Especially preferred is $WO_3$. One of these additives 2 may be used alone, or a mixture of two or more thereof may be used.

It is preferred that the lithium-transition metal compound according to the invention should contain, as still other additive element(s), at least one element selected from B and Bi (hereafter referred to also as "additive element 3 according to the invention"), besides the additive element 1 according to the invention and additive element 2 according to the invention described above. It is preferred that additive element 3 should be boron, between those elements usable as additive element 3 according to the invention, from the standpoint that this element is inexpensively available as an industrial starting material and is a light element.

The kind of the compound (hereinafter referred to also as "additive 3 according to the invention") which contains additive element 3 according to the invention is not particularly limited so long as the compound produces the effects of the invention. Usually, however, use is made of boric acid, a salt of an oxoacid, an oxide, a hydroxide, or the like. Additive 3 according to the invention preferably is boric acid or an oxide, among those compounds usable as additive 3 according to the invention, and especially preferably is boric acid, from the standpoint that these compounds are inexpensively available as industrial starting materials.

Examples of such compounds usable as additive 3 according to the invention include BO, $B_2O_2$, $B_2O_3$, $B_4O_5$, $B_6O$, $B_7O$, $B_{13}O_2$, $LiBO_2$, $LiB_5O_8$, $Li_2B_4O_7$, $HBO_2$, $H_3BO_3$, $B(OH)_3$, $B(OH)_4$, $BiBO_3$, $Bi_2O_3$, $Bi_2O_5$, and $Bi(OH)_3$. Preferred are $B_2O_3$, $H_3BO_3$, and $Bi_2O_3$ from the standpoint that these compounds are relatively inexpensively and easily available as industrial starting materials. Especially preferred is $H_3BO_3$. One of these additives 3 may be used alone, or a mixture of two or more thereof may be used.

In the invention, when additive 3 is used, additive 2 according to the invention and the additive 3 according to the invention may be used in combination besides additive 1 according to the invention, which contains the additive element 1 described above. The range of the total addition amount of the additive 1, which contains the additive element 1 described above, and the additive 2 and the additive 3 based on the total molar amount of the transition metal elements for constituting the main component is as follows. The lower limit thereof is generally 0.1% by mole or more, preferably 0.3% by mole or more, more preferably 0.5% by mole or more, especially preferably 1.0% by mole or more, and the upper limit thereof is generally 15% by mole or less, preferably 10% by mole or less, more preferably 5% by mole or less, especially preferably 3% by mole or less. In case where the total amount thereof is less than the lower limit, there is the possibility that it might be impossible to obtain the effect. In case where the total amount thereof exceeds the upper limit, there is the possibility of resulting in a decrease in battery performance.

<Median Diameter and 90% Cumulative Diameter ($D_{90}$)>

The lithium-transition metal compound powders of the invention have a median diameter which is generally 1 μm or larger, preferably 2.5 μm or larger, more preferably 3 μm or larger, even more preferably 3.5 μm or larger, most preferably 4 μm or larger, and is generally 50 μm or less, preferably 25 μm or less, more preferably 20 μm or less, even more preferably 18 μm or less, most preferably 16 μm or less. In case where the median diameter thereof is less than the lower limit, there is the possibility that such a powder might pose a problem concerning applicability required for forming a positive-electrode active-material layer. In case where the median diameter thereof exceeds the upper limit, there is the possibility of resulting in a decrease in battery performance.

The secondary particles of each of the lithium-transition metal compound powders of the invention have a 90% cumulative diameter ($D_{90}$) which is generally 100 μm or less, preferably 50 μm or less, more preferably 25 μm or less, most preferably 20 μm or less, and is generally 3 μm or larger, preferably 4 μm or larger, more preferably 5 μm or larger, most preferably 6 μm or larger. In case where the 90% cumulative diameter ($D_{90}$) thereof exceeds the upper limit, there is the possibility of resulting in a decrease in battery performance. In case where the 90% cumulative diameter ($D_{90}$) thereof is less than the lower limit, there is the possibility that such a powder might pose a problem concerning applicability required for forming a positive-electrode active-material layer.

In the invention, the median diameter as an average particle diameter and the 90% cumulative diameter ($D_{90}$) are volume-based particle diameters determined through an examination with a known laser diffraction/scattering type particle size distribution analyzer using a set refractive index value of 1.60. In the invention, a 0.1% by weight aqueous solution of sodium hexametaphosphate was used as a dispersion medium in the measurement.

<Average Primary-Particle Diameter>

The lithium-transition metal compound powders of the invention are not particularly limited in the average diameter (average primary-particle diameter) thereof. However, the lower limit of the average primary-particle diameter of each powder is preferably 0.1 μm or larger, more preferably 0.2 μm or larger, most preferably 0.3 μm or larger, and the upper limit thereof is preferably 3 μm or less, more preferably 2 μm or less, even more preferably 1.5 μm or less, most preferably 1.2 μm or less. In case where the average primary-particle diameter thereof exceeds the upper limit, such too large an average primary-particle diameter exerts an adverse influence on powder loading and results in a decrease in specific surface area. There is hence the high possibility of resulting in a decrease in battery performance, e.g., rate characteristics or output characteristics. In case where the average primary-particle diameter thereof is less than the lower limit, the crystals are in an insufficiently developed state. There is hence the possibility of posing problems of, for example, poor charge/discharge reversibility.

Incidentally, the term average primary-particle diameter used in the invention means an average diameter determined through an examination with a scanning electron microscope (SEM). This particle diameter can be determined as an average of the particle diameters of about 10-30 particles using an SEM image having a magnification of 10,000 diameters.

<BET Specific Surface Area>

The lithium-transition metal compound powders of the invention each have a BET specific surface area which is generally 0.5 m$^2$/g or larger, preferably 0.6 m$^2$/g or larger, more preferably 0.7 m$^2$/g or larger, most preferably 0.8 m$^2$/g or larger, and is generally 3 m$^2$/g or less, preferably 2.8 m$^2$/g or less, more preferably 2.5 m$^2$/g or less, most preferably 2.3 m$^2$/g or less. In case where the BET specific surface area thereof is less than that range, battery performances are apt to decrease. In case where the BET specific surface area thereof exceeds that range, such a powder is less apt to have a high bulk density and there is the possibility that this powder is apt to pose a problem concerning applicability required for forming a positive-electrode active-material layer.

Incidentally, BET specific surface area can be determined with a known BET specific surface area measuring apparatus for powders. In the invention, fully automatic specific surface area measuring apparatus for powders Type AMS 8000, manufactured by Ohkura Riken Co., Ltd., was used to conduct a measurement by the continuous-flow BET one-point method using nitrogen as an adsorbate gas and helium as a carrier gas. Specifically, a powder sample was degassed by heating to a temperature of 150° C. with a mixture gas and subsequently cooled to a liquid-nitrogen temperature to adsorb the mixture gas. Thereafter, this sample was heated to room temperature with water to desorb the adsorbed nitrogen gas. The amount of the nitrogen gas thus desorbed was measured with a thermal conductivity detector, and the specific surface area of the sample was calculated therefrom.

<Pore Characteristics by Mercury Intrusion Method>

It is preferred that the lithium-transition metal compound powders of the invention for use as positive-electrode materials for lithium secondary batteries should satisfy specific requirements in a measurement made by the mercury intrusion method.

The mercury intrusion method which is employed for evaluating the lithium-transition metal compound powders of the invention is explained below.

The mercury intrusion method is a technique in which mercury is intruded into the pores of a sample, e.g., porous particles, while applying a pressure, and information on specific surface area, pore diameter distribution, etc. is obtained from the relationship between the pressure and the amount of mercury intruded.

Specifically, a vessel in which a sample has been placed is first evacuated to a vacuum, and the inside of this vessel is thereafter filled with mercury.

Since mercury has a high surface tension, no mercury intrudes into the surface pores of the sample when the system is kept as such. However, when a pressure is applied to the mercury and the pressure is gradually elevated, the pores undergo gradual mercury intrusion thereinto in descending order of pore diameter. By detecting the change of the mercury surface level (i.e., the amount of mercury intruded into pores) while continuously elevating the pressure, a mercury intrusion curve which indicates a relationship between the pressure applied to the mercury and the amount of mercury intruded is obtained.

When the shape of a pore is assumed to be cylindrical and when the radius thereof is expressed by r and the surface tension and contact angle of mercury are expressed by $\delta$ and $\theta$, respectively, then the magnitude of force necessary for forcing out the mercury from the pore is expressed by $-2\pi r\delta(\cos\theta)$ (this value is positive when) $\theta>90°$. Furthermore, the magnitude of force necessary for forcing mercury into the pore at a pressure of P is expressed by $\pi r^2 P$. Consequently, the following mathematical expressions (1) and (2) are derived from a balance between these forces.

$$-2\pi r\delta(\cos\theta)=\pi r^2 P \quad (1)$$

$$Pr=-2\delta(\cos\theta) \quad (2)$$

In the case of mercury, a surface tension $\delta$ of about 480 dyn/cm and a contact angle $\theta$ of about 140° are generally used frequently. When these values are used, the radius of the pore into which mercury is intruded at the pressure P is expressed by the following mathematical expression (3).

[Math. 1]

$$r(\text{nm}) = \frac{7.5 \times 10^8}{P(\text{Pa})} \quad (3)$$

Namely, there is a correlation between the pressure P applied to the mercury and the radius r of the pore into which the mercury intrudes. Consequently, a pore distribution curve which shows a relationship between the dimensions of pore radii of the sample and the volume of the pores can be obtained on the basis of the mercury intrusion curve obtained. For example, when the pressure P is changed from 0.1 MPa to 100 MPa, a measurement can be made with respect to pores ranging from about 7,500 nm to about 7.5 nm.

Incidentally, rough measuring limits in pore radius measurements by the mercury intrusion method are as follows. The lower limit is about 2 nm or larger, and the upper limit is about 200 μm or less. The mercury intrusion method can be regarded as suitable for the analysis of pore distributions in which the pore radii are relatively large, as compared with the nitrogen adsorption method which will be described later.

A measurement by the mercury intrusion method can be made using an apparatus such as, for example, a mercury porosimeter. Examples of the mercury porosimeter include AutoPore, manufactured by Micromeritics Instrument Corp., and PoreMaster, manufactured by Quantachrome Instruments.

It is preferred that the lithium-transition metal compound powders of the invention, when analyzed by the mercury intrusion method, should give a mercury intrusion curve in which the mercury intrusion amount during the pressure rising period from a pressure of 3.86 kPa to 413 MPa of 0.1-1.0 cm$^3$/g. The mercury intrusion amount more preferably is as follows. The lower limit thereof is generally 0.1 cm$^3$/g or more, more preferably 0.15 cm$^3$/g or more, most preferably 0.2 cm$^3$/g or more. The mercury intrusion amount is more preferably 0.9 cm$^3$/g or less, even more preferably 0.8 cm$^3$/g or less, most preferably 0.7 cm$^3$/g or less. In case where the mercury intrusion amount exceeds the upper limit of that range, the particles have too large an amount of interstices. Consequently, when this lithium-transition metal compound powder of the invention is used as a positive-electrode material, the degree of loading of this positive-electrode active material onto the positive-electrode plate is low disadvantageously, resulting in a limited battery capacity. On the other hand, in case where the mercury intrusion amount is less than the lower limit of that range, this powder has too small an amount of interparticle interstices. Consequently, when this lithium-transition metal compound powder of the invention is used as a positive-electrode material to produce a battery, lithium diffusion between the particles is inhibited, resulting in a decrease in load characteristics.

When the lithium-transition metal compound powders of the invention are examined for pore distribution curve by the mercury intrusion method described above, the specific main peak which will be explained below appears.

In this description, the term "pore distribution curve" means a curve in which the radius of each pore has been plotted as abscissa and the value obtained by differentiating the total volume per unit weight (usually 1 g) of the pores each having a radius not less than that radius by the logarithm of that pore radius has been plotted as ordinate. Usually, the curve is given in terms of a graph obtained by connecting the points resulting from the plotting. In particular, a pore distribution curve obtained by examining a lithium-transition metal compound powder of the invention by the mercury intrusion method is suitably referred to as "pore distribution curve according to the invention" in the following description.

In this description, "peak 1" means a peak which appears at 80-800 nm, excluding 800 nm (pore radius), in the pore distribution curve, while "peak 2" means a peak which appears at 800 nm or larger (pore radius) in the pore distribution curve.

In this description, "peak top" means that point on each peak of the pore distribution curve at which the ordinate has the maximum value.

<Peak 1>

The pore distribution curve according to the invention has a peak 1, in which the peak top is present at a pore radius that is generally 80 nm or larger, more preferably 90 nm or larger, most preferably 100 nm or larger, and is generally 800 nm or less, preferably 750 nm or less, more preferably 700 nm or less, even more preferably 650 nm or less, most preferably 600 nm or less. In case where the peak top thereof is present at a pore radius which exceeds the upper limit of that range, this indicates that the amount of interstices present in the particles is too large. Consequently, there is the possibility that when this lithium-transition metal compound powder of the invention is used as a positive-electrode material to produce a battery, the resultant electrode might disadvantageously have a reduced density and the battery might be reduced in characteristics such as discharge capacity. On the other hand, in case where the peak top thereof is present at a pore radius less than the lower limit of that range, this indicates that the powder has no interstices within the particles. Consequently, there is the possibility that when this lithium-transition metal compound powder of the invention is used to produce a positive electrode, a decrease in output characteristics might result.

The peak 1 possessed by the pore distribution curve according to the invention preferably has a pore volume which is generally 0.01 cm$^3$/g or larger, preferably 0.02 cm$^3$/g or larger, more preferably 0.03 cm$^3$/g or larger, most preferably 0.04 cm$^3$/g or larger, and is generally 0.2 cm$^3$/g or less, preferably 0.15 cm$^3$/g or less, more preferably 0.1 cm$^3$/g or less, most preferably 0.08 cm$^3$/g or less. In case where the pore volume thereof exceeds the upper limit of that range, the amount of interstices present among the secondary particles is too large. Consequently, there is the possibility that when this lithium-transition metal compound powder of the invention is used as a positive-electrode material, the degree of loading of this positive-electrode active material onto the positive-electrode plate might be low disadvantageously, resulting in a limited battery capacity. On the other hand, in case where the pore volume thereof is less than the lower limit of that range, the amount of interstices present among the secondary particles is too small disadvantageously. Consequently, there is the possibility that when this lithium-transition metal compound powder of the invention is used as a positive-electrode material to produce a battery, lithium diffusion between the secondary particles might be inhibited, resulting in a decrease in load characteristics.

In the invention, preferred lithium-transition metal compound powders for use as positive-electrode materials for lithium secondary batteries include a lithium-transition metal compound powder which, when examined by the mercury intrusion method, gives a pore distribution curve that has at least one peak 2 in which the peak top is present at a pore radius of 800-4,000 nm and that further has a peak 1 in which the peak top is present at a pore radius of 80 nm or larger but less than 800 nm.

<Peak 2>

The pore distribution curve according to the invention may have a plurality of peaks besides the peak 1 described above. In particular, it is preferred that the pore distribution curve should have a peak 2 in which the peak top is present in the pore radius range of 800-4,000 nm.

The peak 2 possessed by the pore distribution curve according to the invention has a peak top at a pore radius which is generally 800 nm or larger, more preferably 900 nm or larger, most preferably 1,000 nm or larger, and is generally 4,000 nm or less, preferably 3,600 nm or less, more preferably 3,400 nm or less, even more preferably 3,200 nm or less, most preferably 3,000 nm or less. In case where the peak top thereof is present at a pore radius which exceeds the upper limit of that range, there is the possibility that when this lithium-transition metal compound powder of the invention is used as a positive-electrode material to produce a battery, lithium diffusion within the positive-electrode material might be inhibited or the amount of conduction paths might be insufficient, resulting in a decrease in load characteristics. On the other hand, in case where the peak top thereof is present at a pore radius which is less than the lower limit of that range, there is the possibility that when this lithium-transition metal compound powder of the invention is used to produce a positive electrode, then it might be necessary to use a conductive material and a binder in larger amounts, resulting in a limited degree of loading of the active material onto the positive-electrode plate (positive-electrode current collector) and hence in a limited battery capacity. In addition, since such a powder is composed of finer particles, a coating fluid prepared therefrom gives a coating film which is mechanically rigid or is brittle. There is hence the possibility that the coating film might be apt to peel off in a winding step during battery assembly.

The peak which is possessed by the pore distribution curve according to the invention and in which the peak top is present at a pore radius of 800-4,000 nm preferably has a pore volume which is generally 0.1 cm$^3$/g or larger, preferably 0.15 cm$^3$/g or larger, more preferably 0.20 cm$^3$/g or larger, most preferably 0.25 cm$^3$/g or larger, and is generally 0.5 cm$^3$/g or less, preferably 0.45 cm$^3$/g or less, more preferably 0.4 cm$^3$/g or less, most preferably 0.35 cm$^3$/g or less. In case where the pore volume thereof exceeds the upper limit of that range, the amount of interstices is too large. Consequently, there is the possibility that when this lithium-transition metal compound powder of the invention is used as a positive-electrode material, the degree of loading of this positive-electrode active material onto the positive-electrode plate might be low disadvantageously, resulting in a limited battery capacity. On the other hand, in case where the pore volume thereof is less than the lower limit of that range, the amount of interstices present among the particles is too small disadvantageously. Consequently, there is the possibility that when this lithium-transition metal compound powder of the invention is used as a positive-electrode material to produce a battery, lithium diffusion between the secondary particles might be inhibited, resulting in a decrease in load characteristics.

<Bulk Density>

The lithium-transition metal compound powders of the invention have a bulk density which is generally 1.2 g/cm$^3$ or higher, preferably 1.3 g/cm$^3$ or higher, more preferably 1.4 g/cm$^3$ or higher, most preferably 1.5 g/cm$^3$ or higher, and is generally 2.8 g/cm$^3$ or less, preferably 2.7 g/cm$^3$ or less, more preferably 2.6 g/cm$^3$ or less, most preferably 2.5 g/cm$^3$ or less. Bulk densities higher than the upper limit are preferred from the standpoint of improving powder loading and electrode density. However, in such a case, there is the possibility that the powder might have to small a specific surface area and a decrease in battery performance might result. In case where the bulk density thereof is less than the lower limit, there is the possibility that such a bulk density might exert an adverse influence on powder loading and electrode preparation.

In the invention, the bulk density of a lithium-transition metal compound powder is determined by placing 5-10 g of the powder in a 10-mL measuring cylinder made of glass, tapping the cylinder 200 times over a stroke length of about 20 mm, and calculating the density of the densified powder (tap density) in g/cc as the bulk density.

<Crystal Structure>

It is preferred that the lithium-transition metal compound powders of the invention should be powders which at least contain a lithium-nickel-manganese-cobalt composite oxide having a lamellar structure and/or a lithium-manganese composite oxide having a spinel structure as the main component. More preferred of these are powders which contain a lithiumnickel-manganese-cobalt composite oxide having a lamellar structure as the main component, because the crystal lattice undergoes sufficient expansion/contraction to enable the effects of the invention to be produced remarkably. In the invention, the term "lithium-nickel-manganese-cobalt composite oxide" means any of lithium-nickel-manganese-cobalt composite oxides including lithium-nickel-manganese composite oxides which contain no cobalt.

Here, lamellar structures are described in more detail. Among representative crystal systems having a lamellar structure are crystal systems belonging to the α-NaFeO$_2$ type, such as LiCoO$_2$ and LiNiO$_2$. These crystal systems are hexagonal systems and, because of the symmetry thereof, are assigned to the space group $$R\overline{3}m \quad \text{[Math. 2]}$$

(hereinafter often referred to as "lamellar R(-3)m structure").

However, the lamellar LiMeO$_2$ should not be construed as being limited to the lamellar R(-3)m structure. Other examples thereof include LiMnO$_2$ which is called lamellar manganese. This compound is a lamellar compound having a rhombic system and belonging to the space group Pm2m. Examples thereof further include Li$_2$MnO$_3$ which is called 213 phase and can be expressed also as Li[Li$_{1/3}$Mn$_{2/3}$]O$_2$. Although having a monoclinic structure belonging to the space group C2/m, this compound also is a lamellar compound in which lithium layers, [Li$_{1/3}$Mn$_{2/3}$] layers, and oxygen layers have been stacked.

Furthermore, spinel structures are described in more detail. Among representative crystal systems having a spinel structure are crystal systems belonging to the MgAl$_2$O$_4$ type, such as LiMn$_2$O$_4$. These crystal systems are cubic systems and, because of the symmetry thereof, are assigned to the space group $$Fd\overline{3}m \quad \text{[Math. 3]}$$

(hereinafter often referred to as "spinel Fd(-3)m structure").

However, the spinel LiMeO$_4$ should not be construed as being limited to the spinel Fd(-3)m structure. Besides this structure, there is spinel LiMeO$_4$ which belongs to a different space group (P4$_3$32).

<Composition>

It is preferred that the lithium-containing transition metal compound powders of the invention each should be a lithium-transition metal compound powder represented by the following composition formula (A) or (B).

Furthermore, in the case of lamellar compounds, the amount of manganese which dissolves away is relatively small and the influence of manganese on cycle characteristics is slight, as compared with spinel compounds. There is hence a clearer difference in the effects of the invention therebetween. Consequently, it is more preferred that the invention should be a lithium-transition metal compound powder which is represented by the following composition formula (A).

1) In the Case of Lithium-transition Metal Compound Powder represented by the following Composition formula (A)

$$Li_{1+x}MO_2 \quad \text{(A)}$$

In formula (A), x is generally 0 or larger, preferably 0.01 or larger, more preferably 0.02 or larger, most preferably 0.03 or larger, and is generally 0.5 or less, preferably 0.4 or less, more preferably 0.3 or less, most preferably 0.2 or less.

M is elements configured of Li, Ni, and Mn or of Li, Ni, Mn, and Co.

The Mn/Ni molar ratio is generally 0.1 or greater, desirably 0.3 or greater, preferably 0.5 or greater, more preferably 0.6 or greater, even more preferably 0.7 or greater, especially preferably 0.8 or greater, most preferably 0.9 or greater, and is generally 12 or less, preferably 10 or less, more preferably 9 or less, even more preferably 8 or less, most preferably 7 or less.

The Co/(Mn+Ni+Co) molar ratio is generally 0 or greater, preferably 0.01 or greater, more preferably 0.02 or greater, even more preferably 0.03 or greater, most preferably 0.05 or greater, and is generally 0.35 or less, preferably 0.20 or less, more preferably 0.15 or less, even more preferably 0.10 or less, most preferably 0.099 or less.

The molar ratio of Li to M is generally 0.001 or greater, preferably 0.01 or greater, more preferably 0.02 or greater, even more preferably 0.03 or greater, most preferably 0.05 or greater, and is generally 0.2 or less, preferably 0.19 or less, more preferably 0.18 or less, even more preferably 0.17 or less, most preferably 0.15 or less.

Although the oxygen amount in terms of atomic ratio in composition formula (A) is 2 for reasons of convenience, the composition may be non-stoichiometric to some degree. In the case where the composition is non-stoichiometric, the atomic ratio of oxygen is generally in the range of 2±0.2, preferably in the range of 2±0.15, more preferably in the range of 2±0.12, even more preferably in the range of 2±0.10, especially preferably in the range of 2±0.05.

It is preferred that the lithium-transition metal compound powders of the invention each should be a powder produced through burning conducted at a high temperature in an oxygen-containing gas atmosphere in order to enhance the crystallinity of the positive-electrode active material.

The lower limit of the burning temperature, especially in the case of the lithium-nickel-manganese-cobalt composite oxide which has a composition represented by composition formula (A), is generally 1,000° C. or higher, preferably 1,010° C. or higher, more preferably 1,025° C. or higher, most preferably 1,050° C. or higher. The upper limit thereof is 1,250° C. or lower, preferably 1,200° C. or lower, more preferably 1,175° C. or lower, most preferably 1,150° C. or lower. In case where the burning temperature is too low, different phases come to coexist and the crystal structure does not develop, resulting in enhanced lattice distortion. In addition, too large a specific surface area results. Conversely, in case where the burning temperature is too high, the primary particles grow excessively and sintering between particles proceeds too much, resulting in too small a specific surface area.

2) In the Case of Lithium-transition Metal Compound represented by the following General Formula (B).

$$Li[Li_aM'_bMn_{2-b-a}]O_{4+\delta} \quad \text{(B)}$$

In the formula, M' is at least one transition metal selected from Ni, Cr, Fe, Co, and Cu. Most preferred of these is Ni from the standpoint of high-potential charge/discharge capacity.

The value of a is generally 0 or larger, preferably 0.01 or larger, more preferably 0.02 or larger, even more preferably 0.03 or larger, most preferably 0.04 or larger, and is generally 0.3 or less, preferably 0.2 or less, more preferably 0.15 or less, even more preferably 0.1 or less, most preferably 0.075 or less. So long as the value of a is within that range, satisfactory load characteristics are obtained without considerably impairing the energy density per unit weight of the lithium-transition metal compound. Such values of a are hence preferred.

The value of b is generally 0.4 or larger, preferably 0.425 or larger, more preferably 0.45 or larger, even more preferably 0.475 or larger, most preferably 0.49 or larger, and is generally 0.6 or less, preferably 0.575 or less, more preferably 0.55 or less, even more preferably 0.525 or less, most preferably 0.51 or less. So long as the value of b is within that range, the energy density per unit weight of the lithium-transition metal compound is high. Such values of b are hence preferred.

Furthermore, the value of δ is generally in the range of ±0.5, preferably in the range of ±0.4, more preferably in the range of ±0.2, even more preferably in the range of ±0.1, especially in the range of ±0.05. So long as the value of δ is in that range, the crystal structure is highly stable and the battery having an electrode produced using this lithium-transition metal compound has satisfactory cycle characteristics and high-temperature storability. Such values of δ are hence preferred.

The chemical meaning of the lithium composition in the lithium-nickel-manganese composite oxide as a composition of a lithium-transition metal compound according to the invention is explained below in detail.

The values of a and b in the composition formula of the lithium-transition metal compound are determined by analyzing the compound with an inductively coupled plasma emission spectroscope (ICP-AES) for the contents of each transition metal and lithium to determine a Li/Ni/Mn ratio and calculating the values of a and b therefrom.

From the standpoint of structure, it is thought that the atoms of the lithium which is expressed using the affix a have been incorporated as a substituent into sites of the same transition metal. On the principle of charge neutralization, the average valence of M' and manganese is higher than 3.5 because of the lithium expressed using the affix a.

<Reasons why Lithium-Transition Metal Compound Powders of the Invention Bring about the Effects>

The reasons why the lithium-transition metal compound powders of the invention bring about the effects described above are thought to be as follows.

It is presumed that when, during burning of an active material, a compound which melts at a temperature lower than the burning temperature for the active material is present in the system, then the primary particles readily move during the burning, resulting in an increase in bulk density. However, since enlargement of the primary particles results in a decrease in SSA, it is important to conduct the burning while preventing the primary particles from growing. Additive 1 according to the invention is presumed to have the effect of facilitating movement of the primary particles during burning, without growing the primary particles, and thereby heightening the bulk density.

Namely, in each of the lithium-transition metal compound powders of the invention, the secondary crystal particles retain a spherical shape. The powder hence has a large specific surface area while retaining an intact high bulk density. Consequently, when this powder is used to produce a battery, not only it is possible to increase the area of contact between the surface of the positive-electrode active material and the electrolytic solution, but also the positive-electrode active material is made to have a surface state which brings about an improvement in load characteristics. It is presumed that the positive-electrode active material was able to thus attain both an excellent balance among properties and powder handleabilty.

Furthermore, lithium-transition metal compounds, when produced through burning conducted at a high temperature in order to heighten the bulk density, have a reduced specific surface area. In charge/discharge, insertion of lithium ions into the positive-electrode active material and elimination thereof from the positive-electrode active material usually occur in the surface of the particles of the positive-electrode active material. Consequently, it is presumed that a small specific surface area results in a decrease in battery capacity. Especially in a charge/discharge test conducted at a high current density, such a battery shows a considerable decrease in discharge capacity. However, according to the invention, it has become possible to increase specific surface area without lowering bulk density, by mixing a compound having a sulfur atom, a lithium source, and a transition metal source and burning the mixture at a high temperature. It has therefore become apparent that the invention produces the effects thereof especially in a charge/discharge test conducted at a high current density.

Moreover, it can be presumed that, according to the invention, the presence of a compound which has additive element 1 and additive element 2 according to the invention in an active material improves the lithium ion conductivity or electron conductivity and thereby improves the load characteristics of the battery.

[Process for Producing the Lithium-Transition Metal Compound Powders for Positive-Electrode Material for Lithium Secondary Battery]

Processes for producing the lithium-transition metal compound powders of the invention should not be construed as being limited to specific processes. However, a production process which is suitable for producing the powders of the invention includes: a slurry preparation step in which a lithium compound, at least one transition metal compound selected from Mn, Co, and Ni compounds, and an additive according to the invention are pulverized in a liquid medium to obtain a slurry that contains these compounds evenly dispersed therein; a spray drying step in which the slurry obtained is spray-dried; and a burning step in which the resultant spray-dried material is burned.

For example, in the case of a lithium-nickel-manganese-cobalt composite oxide powder as an example, this powder can be produced by spray-drying a slurry obtained by dispersing a lithium compound, a nickel compound, a manganese compound, a cobalt compound, and an additive according to the invention in a liquid medium and then burning the resultant spray-dried material in an oxygen-containing gas atmosphere.

The process of the invention for producing a lithium-transition metal compound powder is explained below in detail with respect to, as an example, a process for producing a lithium-nickel-manganese-cobalt composite oxide powder which is a preferred embodiment of the invention.

<Slurry Preparation Step>

Examples of the lithium compound, among the starting-material compounds to be used for preparing a slurry when a lithium-transition metal compound powder is produced by the process of the invention, include $Li_2CO_3$, $LiNO_3$, $LiNO_2$, LiOH, $LiOH.H_2O$, LiH, LiF, LiCl, LiBr, LiI, $CH_3OOLi$, $Li_2O$, $Li_2SO_4$, the lithium salts of dicarboxylic acids, lithium citrate, the lithium salts of fatty acids, and alkyllithiums. Preferred of these lithium compounds are the lithium compounds which contain neither a nitrogen atom nor a sulfur atom nor a halogen atom, from the standpoint of preventing any harmful substance, e.g., $SO_x$ or $NO_x$, from generating during the burning. Also preferred are compounds which are apt to form interstices in the secondary particles of the spray-dried powder, for example, by generating a decomposition gas in the secondary particles during the burning. When these points are taken into account, $Li_2CO_3$, LiOH, and $LiOH.H_2O$ are preferred, and $Li_2CO_3$ is especially preferred. One of these lithium compounds may be used alone, or two or more thereof may be used in combination.

Examples of the nickel compound include $Ni(OH)_2$, NiO, NiOOH, $NiCO_3$, $2NiCO_3.3Ni(OH)_2.4H_2O$, $NiC_2O_4.2H_2O$, $Ni(NO_3)_2 \cdot 6H_2O$, $NiSO_4$, $NiSO_4 \cdot 6H_2O$, the nickel salts of fatty acids, and nickel halides. Preferred of these are nickel compounds such as $Ni(OH)_2$, $NiO$, $NiOOH$, $NiCO_3$, $2NiCO_3 \cdot 3Ni(OH)_2 \cdot 4H_2O$, and $NiC_2O_4 \cdot 2H_2O$, from the standpoint of preventing any harmful substance, e.g., $SO_x$ or $NO_x$, from generating during the burning. Furthermore, $Ni(OH)_2$, $NiO$, $NiOOH$, and $NiCO_3$ are preferred from the standpoint that these compounds are inexpensively available as industrial starting materials and have high reactivity. Moreover, $Ni(OH)_2$, $NiOOH$, and $NiCO_3$ are especially preferred from the standpoint that these compounds are apt to form interstices in the secondary particles of the spray-dried powder, for example, by generating a decomposition gas during the burning. One of these nickel compounds may be used alone, or two or more thereof may be used in combination.

Examples of the manganese compound include manganese oxides such as $Mn_2O_3$, $MnO_2$, and $Mn_3O_4$, manganese salts such as $MnCO_3$, $Mn(NO_3)_2$, $MnSO_4$, manganese acetate, manganese dicarboxylates, manganese citrate, and the manganese salts of fatty acids, the oxyhydroxide, and halides such as manganese chloride. Preferred of these manganese compounds are $MnO_2$, $Mn_2O_3$, $Mn_3O_4$, and $MnCO_3$, because these compounds not only do not generate a gas such as $SO_x$ or $NO_x$ during the burning but also are inexpensively available as industrial starting materials. One of these manganese compounds may be used alone, or two or more thereof may be used in combination.

Examples of the cobalt compound include $Co(OH)_2$, $CoOOH$, $CoO$, $Co_2O_3$, $Co_3O_4$, $Co(OCOCH_3)_2 \cdot 4H_2O$, $CoCl_2$, $Co(NO_3)_2 \cdot 6H_2O$, $Co(SO_4)_2 \cdot 7H_2O$, and $CoCO_3$. Preferred of these are $Co(OH)_2$, $CoOOH$, $CoO$, $Co_2O_3$, $Co_3O_4$, and $CoCO_3$, from the standpoint that these compounds do not generate a harmful substance, e.g., $SO_x$ or $NO_N$, during the burning step. $Co(OH)_2$ and $CoOOH$ are more preferred from the standpoint that these compounds are inexpensively available industrially and have high reactivity. Especially preferred are $Co(OH)_2$, $CoOOH$, and $CoCO_3$, from the standpoint that these compounds are apt to form interstices in the secondary particles of the spray-dried powder, for example, by generating a decomposition gas during the burning. One of these cobalt compounds may be used alone, or two or more thereof may be used in combination.

Besides the lithium, nickel, manganese, and cobalt source compounds, compounds can be used for the purpose of conducting substitution with other elements to introduce the other elements described above or of efficiently forming interstices in the secondary particles to be formed through the spray drying which will be described later. The timing of adding a compound to be used for the purpose of efficiently forming interstices in the secondary particles can be selected from between before and after starting-material mixing in accordance with the properties of the compound. Especially in the case of compounds which are apt to decompose when mechanical shear stress is applied thereto in the mixing step, it is preferred to add the compounds after the mixing step.

The additive according to the invention is as described above.

Methods for mixing the starting materials are not particularly limited, and may be a wet process or a dry process. Examples thereof include methods in which a device such as, for example, a ball mill, a vibrating mill, or a bead mill is used. Wet mixing in which the starting-material compounds are mixed in a liquid medium, e.g., water or an alcohol, is preferred because more even mixing is possible and because the resultant mixture can be made to show enhanced reactivity in the burning step.

The period of mixing varies depending on mixing methods, and is not limited so long as the starting materials come to be in an evenly mixed state on a particulate level. For example, the period of mixing with a ball mill (wet or dry) is generally about 1 hour to 2 days, and the period of mixing with a bead mill (wet continuous process) is generally about 0.1-6 hours in terms of residence time.

It is preferred that in the stage of starting-material mixing, the starting materials should be pulverized while being mixed. With respect to the degree of pulverization, the diameters of the starting-material particles which have been pulverized are usable as an index. The average particle diameter (median diameter) thereof is generally 0.6 μm or less, preferably 0.55 μm or less, more preferably 0.52 μm or less, most preferably 0.5 μm or less. In case where the average particle diameter of the pulverized starting-material particles is too large, not only the particles have reduced reactivity in the burning step but also it is difficult to obtain an even composition.

It is, however, noted that excessively reducing the particle size results in an increase in pulverization cost. Consequently, to pulverize the starting materials to an average particle diameter of generally 0.01 μm or larger, preferably 0.02 μm or larger, more preferably 0.05 μm or larger, suffices. Although means for attaining such a degree of pulverization are not particularly limited, wet pulverization methods are preferred. Examples thereof include Dyno Mill.

In the invention, the median diameter of the pulverized particles in a slurry is a median diameter determining through a measurement made with a known laser diffraction/scattering type particle size distribution analyzer while setting the refractive index at 1.24 and setting the basis of particle diameter at volume basis. In the invention, a 0.1% by weight aqueous solution of sodium hexametaphosphate was used as a dispersion medium for the measurement, and the measurement was made after a 5-minute ultrasonic dispersion treatment (output, 30 W; frequency, 22.5 kHz).

<Spray Drying Step>

After the wet mixing, the slurry is subsequently subjected usually to a drying step. Methods for the drying are not particularly limited. However, spray drying is preferred, for example, from the standpoints of the evenness, powder flowability, and powder handleability of the particulate material to be yielded and of the ability to efficiently produce dry particles.

(Spray-Dried Powder)

In the process for producing a lithium-transition metal compound powder of the invention, e.g., a lithium-nickel-manganese-cobalt composite oxide powder, the slurry obtained by wet-pulverizing the starting-material compounds and an additive according to the invention is spray-dried to thereby obtain a powder in which the primary particles have aggregated to form secondary particles. A spray-dried powder in which the primary particles have aggregated to form secondary particles is a feature of the shape of the spray-dried powder according to the invention. Examples of methods for ascertaining the shape include an examination with an SEM and an examination of sections with an SEM.

The median diameter (here, a value measured without an ultrasonic dispersion treatment) of the powder to be obtained by the spray drying, which is a burning precursor for a lithium-transition metal compound powder of the invention, e.g., a lithium-nickel-manganese-cobalt composite oxide powder, is regulated to generally 25 μm or less, more preferably 20 μm or less, even more preferably 18 μm or less, most preferably 16 μm or less. However, since too small particle diameters tend to be difficult to obtain, the median diameter thereof is generally 3 µm or larger, preferably 4 µm or larger, more preferably 5 µm or larger. In the case where particulate matter is to be produced by a spray drying method, the particle diameter thereof can be regulated by suitably selecting a mode of spraying, a pressurized-gas feed rate, a slurry feed rate, a drying temperature, etc.

Specifically, when a slurry obtained by dispersing a lithium compound, a nickel compound, a manganese compound, a cobalt compound, and an additive according to the invention in a liquid medium is spray-dried and the resultant powder is burned to produce a lithium-nickel-manganese-cobalt composite oxide powder, then the spray drying is conducted, for example, under the conditions of a slurry viscosity V of 50 cP≤V≤7,000 cP and a gas-liquid ratio G/S of 500≤G/S≤10,000, wherein V (cP) is the viscosity of the slurry being subjected to the spray drying, S (L/min) is the slurry feed rate, and G (L/min) is the gas feed rate.

In case where the slurry viscosity V (cP) is too low, there is the possibility that a powder configured of secondary particles formed by aggregation of primary particles might be difficult to obtain. In case where the slurry viscosity is too high, there is the possibility that the feed pump might go wrong or the nozzle might clog. Consequently, the lower limit of the slurry viscosity V (cP) is generally 50 cP or higher, preferably 100 cP or higher, more preferably 300 cP or higher, most preferably 500 cP or higher, and the upper limit thereof is generally 7,000 cP or less, preferably 6,500 cP or less, more preferably 5,500 cP or less, most preferably 5,000 cP or less.

Meanwhile, in case where the gas-liquid ratio G/S is less than the lower limit, this arouses troubles, for example, that too large secondary particles are apt to be yielded and the sprayed slurry is less apt to be dried. In case where the gas-liquid ratio G/S exceeds the upper limit, there is the possibility of resulting in a decrease in productivity. Consequently, the lower limit of the gas-liquid ratio G/S is generally 500 or greater, preferably 800 or greater, more preferably 1,000 or greater, most preferably 1,500 or greater, and the upper limit thereof is generally 10,000 or less, preferably 9,000 or less, more preferably 8,000 or less, most preferably 7,500 or less.

The slurry feed rate S and the gas feed rate G are suitably set in accordance with the viscosity of the slurry being subjected to the spray drying, the specifications of the spray dryer to be used, etc.

In the process of the invention, methods for the spray drying are not particularly limited so long as the spray drying is conducted so as to satisfy the slurry viscosity V (cP) described above and the slurry feed rate and the gas feed rate are regulated so as to be suitable for the specifications of the spray dryer used and so long as the gas-liquid ratio G/S described above is satisfied. Although other conditions are suitably set in accordance with the kinds of devices used, etc., it is preferred to further select the following conditions.

Namely, it is preferred to conduct the spray drying of the slurry at a temperature which is generally 50° C. or higher, preferably 70° C. or higher, more preferably 120° C. or higher, most preferably 140° C. or higher, and is generally 300° C. or lower, preferably 250° C. or lower, more preferably 200° C. or lower, most preferably 180° C. or lower. In case where the temperature is too high, there is the possibility that the granule particles obtained might have hollow structures in a large amount and the powder might show a reduced loading density. On the other hand, in case where the temperature is too low, there is the possibility of posing problems of, for example, powder sticking/clogging due to water condensation at the powder outlet.

<Burning Step>

The burning precursor thus obtained is subsequently burned.

The term "burning precursor" in the invention means an unburned precursor for a lithium-transition metal compound, e.g., a lithium-nickel-manganese-cobalt composite oxide, the unburned precursor being obtained by treating the spray-dried powder. For example, a compound which, during the burning, generates a decomposition gas or sublimes and which thereby forms interstices in the secondary particles may be incorporated into the spray-dried powder to obtain a burning precursor.

Conditions for this burning depend also on the composition and on the lithium compound used as a starting material. However, there is a tendency that too high a burning temperature results in excessive growth of the primary particles and excessive interparticle sintering and hence in too small a specific surface area. Conversely, in case where the burning temperature is too low, different phases come to coexist and the crystal structure does not develop, resulting in enhanced lattice distortion. In addition, too large a specific surface area results. The burning temperature is generally 1,000° C. or higher, preferably 1,010° C. or higher, more preferably 1,025° C. or higher, most preferably 1,050° C. or higher, and is generally 1,250° C. or lower, preferably 1,200° C. or lower, more preferably 1,175° C. or lower, most preferably 1,150° C. or lower.

For the burning, use can be made, for example, of a box furnace, tube furnace, tunnel kiln, rotary kiln, or the like. The burning step usually is divided into three parts, i.e., temperature rising, maximum-temperature holding, and temperature declining. The second part, i.e., maximum-temperature holding, need not be always conducted once, and may be performed in two or more stages according to purposes. The steps of temperature rising, maximum-temperature holding, and temperature declining may be conducted two times or further repeated while performing a disaggregation step, which is a step for eliminating the aggregation to such a degree that the secondary particles are not destroyed, or a pulverization step, which is a step for pulverizing the powder to the primary particles or to a finer powder, before each repetition.

In the case where the burning is conducted in two stages, it is preferred that in the first stage, the precursor should be held at a temperature which is not lower than the temperature at which the lithium source begins to decompose and which is not higher than the temperature at which the lithium source melts. For example, in the case where lithium carbonate is used, the holding temperature in the first stage is preferably 400° C. or higher, more preferably 450° C. or higher, even more preferably 500° C. or higher, most preferably 550° C. or higher, and is generally 850° C. or lower, more preferably 800° C. or lower, even more preferably 780° C. or lower, most preferably 750° C. or lower.

In the temperature rising step, which precedes the maximum-temperature holding step, the internal temperature of the furnace is elevated generally at a heating rate of 1-15° C./min. Too low heating rates are industrially disadvantageous because too much time is required. However, too high heating rates pose a problem in some furnaces that the internal temperature does not follow a set temperature. The heating rate is preferably 2° C./min or higher, more preferably 3° C./min or higher, and is preferably 20° C./min or less, more preferably 18° C./min or less.

The holding period in the maximum-temperature holding step varies depending on temperature. However, so long as the temperature is within that range, the holding period usually is 15 minutes or longer, preferably 30 minutes or longer, more preferably 45 minutes or longer, most preferably 1 hour or longer, and is 24 hours or less, preferably 12 hours or less, more preferably 9 hours or less, most preferably 6 hours or less. In case where the burning period is too short, it is difficult to obtain a lithium-transition metal compound powder having satisfactory crystallinity. Meanwhile, too long periods are impracticable. Too long burning periods are disadvantageous because the resultant burned powder necessitates disaggregation or is difficult to disaggregate.

In the temperature declining step, the internal temperature of the furnace is lowered usually at a cooling rate of 0.1-15° C./min. Too low cooling rates require much time and are industrially disadvantageous, while too high cooling rates tend to give a product having poor evenness or to accelerate deterioration of the vessel. The cooling rate is preferably 1° C./min or higher, more preferably 3° C./min or higher, and is preferably 20° C./min or less, more preferably 15° C./min or less.

The atmosphere to be used for the burning has a suitable range of partial oxygen pressure according to the composition of the lithium-transition metal compound powder to be obtained. Consequently, various suitable gas atmospheres for satisfying the range are used. Examples of the gas atmospheres include oxygen, air, nitrogen, argon, hydrogen, carbon dioxide, and gaseous mixtures thereof. For producing a lithium-nickel-manganese-cobalt composite oxide powder as an embodiment of the invention, use can be made of an oxygen-containing gas atmosphere, e.g., air. The atmosphere is usually regulated so as to have an oxygen concentration which is 1% by volume or higher, preferably 10% by volume or higher, more preferably 15% by volume or higher, and is 100% by volume or less, preferably 50% by volume or less, more preferably 25% by volume or less.

In the case where a lithium-transition metal compound powder of the invention, e.g., a lithium-nickel-manganese-cobalt composite oxide powder having the specific composition described above, is produced by such a production process using production conditions which are kept constant, the Li/Ni/Mn/Co molar ratio can be regulated to a target value by regulating the mixing ratio among the lithium compound, nickel compound, manganese compound, and cobalt compound when these compounds and an additive according to the invention are dispersed in a liquid medium to prepare a slurry.

The lithium-transition metal compound powder of the invention thus obtained, e.g., a lithium-nickel-manganese-cobalt composite oxide powder, makes it possible to provide a positive-electrode material for lithium secondary batteries which have a high capacity, are excellent in terms of low-temperature output characteristics and storability, and have a satisfactory balance among performances.

[Positive Electrode for Lithium Secondary Battery]

The positive electrode for lithium secondary batteries of the invention includes a current collector and, formed thereon, a positive-electrode active-material layer which includes both a lithium-transition metal compound powder of the invention for positive-electrode materials for lithium secondary batteries and a binder.

The positive-electrode active-material layer usually is produced by mixing the positive-electrode material with a binder by a dry process optionally together with a conductive material, a thickener, etc., forming the mixture into a sheet, and press-bonding the sheet to a positive-electrode current collector, or by dissolving or dispersing those materials in a liquid medium to obtain a slurry, applying the slurry to a positive-electrode current collector, and drying the slurry applied.

As the material of the positive-electrode current collector, use is usually made of a metallic material such as aluminum, stainless steel, a nickel-plated material, titanium, or tantalum or a carbon material such as a carbon cloth or a carbon paper. Preferred of these are metallic materials. Especially preferred is aluminum. With respect to shape, examples of shapes in the case of metallic materials include metal foils, metal cylinders, metal coils, metal plates, thin metal films, expanded metals, punching metals, and metal foam. In the case of carbon materials, examples of the shapes thereof include carbon plates, thin carbon films, and carbon cylinders. Preferred of these are thin metal films because these films are currently in use in products produced industrially. The thin films may be suitably processed into a mesh form.

In the case where a thin film is used as the positive-electrode current collector, this thin film may have any desired thickness. However, the thickness thereof is generally 1 µm or larger, preferably 3 µm or larger, more preferably 5 µm or larger, and is generally 100 mm or less, preferably 1 mm or less, more preferably 50 µm or less. In case where the thin film has a thickness less than that range, there is the possibility that this film might be insufficient in the strength required of current collectors. On the other hand, in case where the film has a thickness larger than that range, there is the possibility that this film might have impaired handleability.

The binder to be used for producing the positive-electrode active-material layer is not particularly limited. In the case of layer formation through coating fluid application, any binder may be used so long as the binder is a material which is stable to the liquid medium to be used for electrode production. Examples thereof include resinous polymers such as polyethylene, polypropylene, poly(ethylene terephthalate), poly(methyl methacrylate), aromatic polyamides, cellulose, and nitrocellulose, rubbery polymers such as SBR (styrene/butadiene rubbers), NBR (acrylonitrile/butadiene rubbers), fluororubbers, isoprene rubbers, butadiene rubbers, and ethylene/propylene rubbers, thermoplastic elastomeric polymers such as styrene/butadiene/styrene block copolymers and products of hydrogenation thereof, EPDM (ethylene/propylene/diene terpolymers), styrene/ethylene/butadiene/ethylene copolymers, and styrene/isoprene/styrene block copolymers and products of hydrogenation thereof, flexible resinous polymers such as syndiotactic 1,2-polybutadiene, poly(vinyl acetate), ethylene/vinyl acetate copolymers, and propylene/α-olefin copolymers, fluorochemical polymers such as poly(vinylidene fluoride), polytetrafluoroethylene, fluorinated poly(vinylidene fluoride), and polytetrafluoroethylene/ethylene copolymers, and polymer compositions having the property of conducting alkali metal ions (especially lithium ions). One of these substances may be used alone, or any desired two or more thereof may be used in combination in any desired proportion.

The proportion of the binder in the positive-electrode active-material layer is generally 0.1% by weight or higher, preferably 1% by weight or higher, more preferably 5% by weight or higher, and is generally 80% by weight or less, preferably 60% by weight or less, more preferably 40% by weight or less, most preferably 10% by weight or less. In case where the proportion of the binder is too low, there is the possibility that the positive-electrode active material cannot be sufficiently held and the positive electrode might have insufficient mechanical strength, resulting in a decrease in battery performance, e.g., cycle characteristics. On the other hand, in case where the proportion thereof is too high, there is the possibility that such too high a proportion might lead to a decrease in battery capacity or electrical conductivity.

A conductive material is usually incorporated into the positive-electrode active-material layer in order to enhance electrical conductivity. The conductive material is not particularly limited in the kind thereof. Examples thereof include metallic materials such as copper and nickel and carbon materials such as graphites, e.g., natural graphites and artificial graphites, carbon blacks, e.g., acetylene black, and amorphous carbon, e.g., needle coke. One of these substances may be used alone, or any desired two or more thereof may be used in combination in any desired proportion. The proportion of the conductive material in the positive-electrode active-material layer is generally 0.01% by weight or higher, preferably 0.1% by weight or higher, more preferably 1% by weight or higher, and is generally 50% by weight or less, preferably 30% by weight or less, more preferably 20% by weight or less. When the proportion of the conductive material is too low, there are cases where electrical conductivity is insufficient. Conversely, when the proportion thereof is too high, there are cases where a decrease in battery capacity results.

The liquid medium to be used for forming a slurry is not particularly limited in the kind thereof so long as the liquid medium is a solvent in which not only the lithium-transition metal compound powder as a positive-electrode material and a binder but also a conductive material and a thickener, which are used according to need, can be dissolved or dispersed. Either an aqueous solvent or an organic solvent may be used. Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethylenetriamine, N,N-dimethylaminopropylamine, ethylene oxide, tetrahydrofuran (THF), toluene, acetone, dimethyl ether, dimethylacetamide, hexamethylphosphoramide, dimethyl sulfoxide, benzene, xylene, quinoline, pyridine, methylnaphthalene, and hexane. Especially when an aqueous solvent is used, a dispersant is added in combination with a thickener to slurry the mixture using a latex of, for example, an SBR. One of those solvents may be used alone, or any desired two or more thereof may be used in combination in any desired proportion.

The content of the lithium-transition metal compound powder of the invention, as a positive-electrode material, in the positive-electrode active-material layer is generally 10% by weight or higher, preferably 30% by weight or higher, more preferably 50% by weight or higher, and is generally 99.9% by weight or less, preferably 99% by weight or less. In case where the proportion of the lithium-transition metal compound powder in the positive-electrode active-material layer is too high, this positive electrode tends to have insufficient strength. When the proportion thereof is too low, there are cases where this positive electrode is insufficient in capacity.

The positive-electrode active-material layer has a thickness of generally about 10-200 μm.

The positive electrode, after pressed, has the following electrode density. The lower limit of the density thereof is generally 2.2 g/cm$^3$ or higher, preferably 2.4 g/cm$^3$ or higher, especially preferably 2.6 g/cm$^3$ or higher, and the upper limit thereof is generally 4.2 g/cm$^3$ or less, preferably 4.0 g/cm$^3$ or less, especially preferably 3.8 g/cm$^3$ or less.

It is preferred that the positive-electrode active-material layer obtained through coating fluid application and drying should be densified with a roller press or the like in order to heighten the loading density of the positive-electrode active material.

Thus, the positive electrode of the invention for lithium secondary batteries can be prepared.

[Lithium Secondary Battery]

The lithium secondary battery of the invention includes the positive electrode of the invention for lithium secondary batteries, which is capable of occluding and releasing lithium, a negative electrode that is capable of occluding and releasing lithium, and a nonaqueous electrolyte that contains a lithium salt as an electrolyte salt. Furthermore, the battery may be equipped with a separator for holding the nonaqueous electrolyte, between the positive electrode and the negative electrode. It is desirable to thus interpose a separator in order to effectively prevent a short-circuit due to contact between the positive electrode and the negative electrode.

<Negative Electrode>

Like the positive electrode, the negative electrode is usually configured by forming a negative-electrode active-material layer on a negative-electrode current collector.

As the material of the negative-electrode current collector, use is made of a metallic material such as copper, nickel, stainless steel, or nickel-plated steel or a carbon material such as a carbon cloth or a carbon paper. In the case of metallic materials of these, examples thereof include metal foils, metal cylinders, metal coils, metal plates, and thin metal films. In the case of carbon materials, examples thereof include carbon plates, thin carbon films, and carbon cylinders. Preferred of these are thin metal films because these films are currently in use in products produced industrially. The thin films may be suitably processed into a mesh form. In the case where a thin metal film is used as the negative-electrode current collector, the range of preferred thicknesses thereof is the same as the range described above with regard to the positive-electrode current collector.

The negative-electrode active-material layer is configured so as to contain a negative-electrode active material. The negative-electrode active material is not limited in the kind thereof so long as the active material is capable of electrochemically occluding and releasing lithium ions. Usually, however, a carbon material which is capable of occluding and releasing lithium is used from the standpoint of high safety.

The carbon material is not particularly limited in the kind thereof. Examples thereof include graphites, such as artificial graphites and natural graphites, and pyrolysis residues obtained by pyrolyzing organic substances under various pyrolysis conditions. Examples of the residues of pyrolysis of organic substances include products of carbonization of coal coke, petroleum coke, and coal pitch, products of carbonization of petroleum pitch, products of carbonization of these pitches which have been oxidized, products of carbonization of needle coke, pitch coke, phenol resins, and crystalline cellulose, and carbon materials obtained by partly graphitizing such carbonization products. Examples thereof further include furnace black, acetylene black, and pitch-based carbon fibers. Preferred of these are graphites. It is especially suitable to mainly use a carbon material which is an artificial graphite produced by subjecting a readily graphitizable pitch obtained from any of various starting materials to a high-temperature heat treatment, a purified natural graphite, a graphite material including either of these graphites and a pitch incorporated thereinto, or the like and which has undergone any of various surface treatments. Those carbon materials each may be used alone, or two or more thereof may be used in combination.

In the case where a graphite material is used as the negative-electrode active material, it is preferred that the value of d (interplanar spacing: $d_{002}$) for the lattice planes (002) thereof, as determined by X-ray diffractometry in accordance with the method of the Japan Society for Promotion of Scientific Research, should be generally 0.335 nm or larger, and be generally 0.34 nm or less, preferably 0.337 nm or less.

It is also preferred that the graphite material should have an ash content of generally 1% by weight or less, in particular 0.5% by weight or less, especially 0.1% by weight or less, based on the weight of the graphite material.

Furthermore, it is preferred that the crystallite size ($L_a$) of the graphite material, as determined by X-ray diffractometry in accordance with the method of the Japan Society for Promotion of Scientific Research, should be generally 30 nm or larger, in particular 50 nm or larger, especially 100 nm or larger.

It is preferred that the median diameter of the graphite material, as determined by the laser diffraction/scattering method, should be generally 1 μm or larger, in particular 3 μm or larger, preferably 5 μm or larger, especially 7 μm or larger, and be generally 100 μm or less, in particular 50 μm or less, preferably 40 μm or less, especially 30 μm or less.

The graphite material has a BET specific surface area which is generally 0.5 m$^2$/g or larger, preferably 0.7 m$^2$/g or larger, more preferably 1.0 m$^2$/g or larger, even more preferably 1.5 m$^2$/g or larger, and is generally 25.0 m$^2$/g or less, preferably 20.0 m$^2$/g or less, more preferably 15.0 m$^2$/g or less, even more preferably 10.0 m$^2$/g or less.

Moreover, it is preferred that when the graphite material is analyzed by Raman spectroscopy using argon laser light, then the ratio of the intensity $I_A$ of a peak $P_A$ observed in the range of 1,580-1,620 cm$^{-1}$ to the intensity $I_B$ of a peak $P_B$ observed in the range of 1,350-1,370 cm$^{-1}$, $I_A/I_B$, should be 0-0.5. Furthermore, the half-value width of the peak $P_A$ is preferably 26 cm$^{-1}$ or less, more preferably 25 cm$^{-1}$ or less.

Besides the various carbon materials described above, other materials capable of occluding and releasing lithium can be used as negative-electrode active materials. Examples of negative-electrode active materials other than carbon materials include metal oxides such as tin oxide and silicon oxide, nitrides such as $Li_{26}Co_{0.4}N$, elemental lithium, and lithium alloys such as lithium-aluminum alloys. One of these materials other than carbon materials may be used alone, or two or more thereof may be used in combination. Any of these materials may be used in combination with any of the carbon materials described above.

Like the positive-electrode active-material layer, the negative-electrode active-material layer can be produced usually by slurrying the negative-electrode active material and a binder with a liquid medium optionally together with a conductive material and a thickener, applying the slurry to a negative-electrode current collector, and drying the slurry applied. As the liquid medium, binder, thickener, conductive material, etc. for slurry formation, use can be made of the same ingredients as those described above with regard to the positive-electrode active-material layer.

<Nonaqueous Electrolyte>

As the nonaqueous electrolyte, use can be made of a known organic electrolytic solution, solid polymer electrolyte, gel electrolyte, solid inorganic electrolyte, or the like. Preferred of these is an organic electrolytic solution. The organic electrolytic solution is configured by dissolving a solute (electrolyte) in an organic solvent.

The kind of the organic solvent is not particularly limited. For example, use can be made of carbonates, ethers, ketones, sulfolane compounds, lactones, nitriles, chlorinated hydrocarbons, ethers, amines, esters, amides, phosphoric acid esters, and the like. Representative examples thereof include dimethyl carbonate, diethyl carbonate, ethyl methyl carbonate, propylene carbonate, ethylene carbonate, vinyl carbonate, vinylethylene carbonate, tetrahydrofuran, 2-methyltetrahydrofuran, 1,4-dioxane, 4-methyl-2-pentanone, 1,2-dimethoxyethane, 1,2-diethoxyethane, γ-butyrolactone, 1,3-dioxolane, 4-methyl-1,3-dioxolane, diethyl ether, sulfolane, methylsulfolane, acetonitrile, propionitrile, benzonitrile, butyronitrile, valeronitrile, 1,2-dichloroethane, dimethylformamide, dimethyl sulfoxide, trimethyl phosphate, and triethyl phosphate. In these compounds, part of the hydrogen atoms may have been replaced with halogen atoms. These compounds may be used either alone or as a mixed solvent compound of two or more thereof.

It is preferred that the organic solvent described above should include a high-permittivity solvent from the standpoint of dissociating the electrolyte salt. The term high-permittivity solvent herein means a compound which has a relative permittivity at 25° C. of 20 or higher. It is preferred that among such high-permittivity solvents, any of ethylene carbonate, propylene carbonate, and compounds formed by replacing hydrogen atoms of these carbonates with other element(s), e.g., a halogen, or with an alkyl group or the like should be contained in the electrolytic solution. The proportion of the high-permittivity solvent in the electrolytic solution is preferably 20% by weight or higher, more preferably 25% by weight or higher, most preferably 30% by weight or higher. When the content of the high-permittivity solvent is less than that range, there are cases where desired battery characteristics are not obtained.

An additive which forms, on the surface of the negative electrode, a satisfactory coating film that renders efficient charge/discharge of lithium ions possible, such as a gas, e.g., $CO_2$, $N_2O$, $CO$, or $SO_2$, vinylene carbonate, or a polysulfide-$S_x^{2-}$, may be added to the organic electrolytic solution in any desired proportion. Especially preferred of such additives is vinylene carbonate.

Furthermore, an additive which has the effect of improving cycle life or output characteristics, such as, for example, lithium difluorophosphate, and an additive which has the effect of inhibiting gas evolution during high-temperature storage, such as, for example, propanesultone or propenesultone, may be added to the organic electrolytic solution in any desired proportion.

The kind of the electrolyte salt also is not particularly limited, and any desired conventionally known solutes can be used. Examples thereof include $LiClO_4$, $LiAsF_6$, $LiPF_6$, $LiBF_4$, $LiB(C_6H_5)_4$, LiBOB, LiCl, LiBr, $CH_3SO_3Li$, $CF_3SO_3Li$, $LiN(SO_2CF_3)_2$, $LiN(SO_2C_2F_5)_2$, $LiC(SO_2CF_3)_3$, and $LiN(SO_3CF_3)_2$. Any desired one of these electrolyte salts may be used alone, or any desired two or more thereof may be used in combination in any desired proportion.

Such a lithium salt as an electrolyte salt may be incorporated into the electrolytic solution so as to result in a concentration thereof of generally 0.5-1.5 mol/L. In case where the concentration of the lithium salt in the electrolytic solution is either less than 0.5 mol/L or higher than 1.5 mol/L, this electrolytic solution has a reduced electrical conductivity and this may exert an adverse influence on battery characteristics. The lower limit of the concentration thereof preferably is 0.75 mol/L or higher, and the upper limit thereof preferably is 1.25 mol/L or less.

Also in the case where a solid polymer electrolyte is used, the kind thereof is not particularly limited. Use can be made of any desired crystalline or amorphous inorganic substance which is known as a solid electrolyte. Examples of crystalline inorganic solid electrolytes include LiI, $Li_3N$, $Li_{1+x}J_xTi_{2-x}(PO_4)_3$ (J=Al, Sc, Y, La), and $Li_{0.5-3x}RE_{0.5+x}TiO_3$ (RE=La, Pr, Nd, Sm). Examples of amorphous inorganic solid electrolytes include oxide glasses such as 4.9LiI-34.1$Li_2O$-61$B_2O_5$ and 33.3Li$_2$O-66.7SiO$_2$. Any desired one of these may be used alone, or any desired two or more thereof may be used in combination in any desired proportion.

<Separator>

In the case where the organic electrolytic solution described above is used as an electrolyte, a separator is interposed between the positive electrode and the negative electrode in order to prevent a short-circuit between the electrodes. Although the separator is not particularly limited in the material and shape thereof, it is preferred to use a separator which is stable to the organic electrolytic solution to be used and has excellent liquid retentivity and which can reliably prevent a short-circuit from occurring between the electrodes. Preferred examples thereof include microporous films or sheets, nonwoven fabric, and the like which are made of various polymeric materials. Examples of the polymeric materials which are usable include nylons, cellulose acetate, nitrocellulose, polysulfones, polyacrylonitrile, poly(vinylidene fluoride), and polyolefin polymers such as polypropylene, polyethylene, and polybutene. In particular, from the standpoint of chemical and electrochemical stability, which is an important factor in separators, polyolefin polymers are preferred. From the standpoint of self-shutoff temperature, which is one of the purposes of the use of a separator in batteries, polyethylene is especially desirable.

In the case where a separator constituted of polyethylene is used, it is preferred to employ ultrahigh-molecular-weight polyethylene from the standpoint of high-temperature shape retentivity. The lower limit of the molecular weight thereof is preferably 500,000, more preferably 1,000,000, most preferably 1,500,000. On the other hand, the upper limit of the molecular weight thereof is preferably 5,000,000, more preferably 4,000,000, most preferably 3,000,000. The reason for this is as follows: when the polyethylene has too high a molecular weight, the flowability thereof is so low that there are cases where the pores of the separator do not close upon heating.

<Battery Shape>

The lithium secondary battery of the invention is produced by assembling the positive electrode of the invention for lithium secondary batteries described above, a negative electrode, an electrolyte, and a separator, which is used according to need, into an appropriate shape. Other constituent elements such as, for example, an outer case can be further used according to need.

The shape of the lithium secondary battery of the invention is not particularly limited, and can be suitably selected, according to the intended use thereof, from various shapes in general use. Examples of the shapes in general use include: a cylinder type in which sheet electrodes and separators have been spirally wound; a cylinder type of the inside-out structure which includes a combination of pellet electrodes and a separator; and a coin type in which pellet electrodes and a separator have been stacked. Methods for assembling the battery also are not particularly limited, and a method suitable for the desired battery shape can be selected from various methods in common use.

<Charging Potential of the Positive Electrode in Fully Charged State>

The lithium secondary battery of the invention produces the effects thereof especially when the battery has been designed so that the positive electrode has a charging potential of 4.4 V (vs. Li/Li$^+$) or higher when the battery is in a fully charged state, as in the Examples which will be given later. Namely, the lithium-nickel-manganese-cobalt composite oxide powder of the invention for a positive-electrode material of lithium secondary batteries effectively produces the effects of the invention when used in a lithium secondary battery which has been designed so as to be charged at a high charging potential. However, the effects are sufficiently produced even at potentials lower than 4.4 V (vs. Li/Li$^+$).

General embodiments of the lithium secondary battery of the invention were explained above. However, the lithium secondary battery of the invention should not be construed as being limited to the embodiments, and the invention can be variously modified unless the modifications depart from the spirit of the invention.

EXAMPLES

The invention will be explained below in more detail by reference to Examples. However, the invention should not be construed as being limited by the following Examples unless the invention departs from the spirit thereof.

[Methods for Determining Properties]

Properties of the lithium-transition metal compound powder produced in each of the Examples and Comparative Examples which will be given later were determined in the following manners.

<Surface Composition Analysis of Primary Particles by X-Ray Photoelectron Spectroscopy (XPS)>

The analysis was conducted using X-ray photoelectron spectroscope "ESCA-5700", manufactured by Physical Electronics, Inc., under the following conditions.

X-ray source: monochromatic AlKα

Analysis area: 0.8 mm in diameter

Pickup angle: 45°

Method for quantitative analysis: The areas of the peaks B1s, Mn2P$_{1/2}$, Co2P$_{3/2}$, Ni2P$_{3/2}$, Nb3d, Mo3d, Sn3d$_{5/2}$, W4f, and P2P were corrected with sensitivity.

<Production of Cross-Section of Secondary Particle>

A cross-section of a secondary particle was produced using a cross-section polisher (SM-09010) manufactured by JEOL Ltd., under the conditions of an accelerating voltage of 5 kV.

<SEM Examination Apparatus and Conditions>

An SEM examination was made using a scanning electron microscope (SU-70) manufactured by HITACHI, at an electron gun accelerating voltage of 3 kV. With respect to the examination mode, an examination was made using a YAG type reflected-electron detector (hereinafter the image obtained is referred to as reflected-electron image).

The amount of reflected electrons is proportional to the average atomic number of the components of the sample. Consequently, a reflected-electron image has a contrast in which the brightness is in proportion to the average atomic number. A part which is dark in contrast to the positive-electrode active material can be assigned to a compound that has a phosphorus (or silicon) atom. Furthermore, the part which is observed as an extremely bright part in a contrast in the vicinity of the boundaries of the primary particles is a compound that has a tungsten atom.

Incidentally, the contrast of a reflected-electron image is affected mainly by information on composition and information on surface shape. However, since the cross-section prepared here is exceedingly smooth, the information on surface shape is substantially negligible. Namely, the contrast is mostly governed by the composition.

<SEM-EDX Analysis Apparatus and Conditions>

SEM-EDX analysis was conducted using OXFORD INSTRUMENTS INCA Energy at an electron gun accelerating voltage of 3 kV.

<Median Diameter of Secondary Particles>

A measurement was made with a known laser diffraction/scattering type particle size distribution analyzer while setting the refractive index at 1.60 and setting the basis of particle diameter at volume basis. A 0.1% by weight aqueous solution of sodium hexametaphosphate was used as a dispersion medium to conduct the measurement.

<Average Primary-Particle Diameter>

The diameter was determined from an SEM image having a magnification of 10,000 diameters.

<Determination of Various Properties by Mercury Intrusion Method>

As an apparatus for a measurement made by the mercury intrusion method, use was made of AutoPore Type 1119450, manufactured by Micromeritics Instrument Corp. The measurement by the mercury intrusion method was made at a room temperature while elevating the pressure from 3.86 kPa to 413 MPa. The surface tension value and contact angle value used for the mercury were 480 dyn/cm and 141.3°, respectively.

<Bulk Density>

The bulk density of a powder was determined by placing 10 g of a sample of the powder in a 10-mL measuring cylinder made of glass, tapping the cylinder 200 times over a stroke length of about 20 mm, and calculating the density of the densified powder.

<Specific Surface Area>

The specific surface area was determined by the BET method.

<Median Diameter of Pulverized Particles in Slurry>

A measurement was made with a known laser diffraction/scattering type particle size distribution analyzer while setting the refractive index at 1.24 and setting the basis of particle diameter at volume basis. A 0.1% by weight aqueous solution of sodium hexametaphosphate was used as a dispersion medium, and the measurement was made after a 5-minute ultrasonic dispersion treatment (output, 30 W; frequency, 22.5 kHz).

Production of Lithium-Transition Metal Compound Powders (Examples and Comparative Examples)

Example 1

$Li_2CO_3$, $NiCO_3$, $Mn_3O_4$, CoOOH, $H_3BO_3$, $WO_3$, and $Li_2SO_4$ were weighed out and mixed together so as to result in a Li:Ni:Mn:Co:B:W:S molar ratio of 1.12:0.45:0.45:0.10: 0.0025:0.015:0.0075. Thereafter, pure water was added thereto to prepare a slurry. A circulating wet-process pulverizer of the dispersing medium agitation type was used to pulverize the solid matter contained in the slurry to a median diameter of 0.50 µm while stirring the slurry.

Subsequently, this slurry (solid content, 38% by weight; viscosity, 1,100 cP) was spray-dried using a two-fluid nozzle type spray dryer (Type LT-8, manufactured by Ohkawara Kakohki Co., Ltd.). Air was used here as a drying gas, and the drying-gas introduction rate G and the slurry introduction rate S were regulated to 45 L/min and 6×10⁻³ L/min, respectively (gas-liquid ratio G/S=7,500). The drying gas inlet temperature was set at 150° C. The particulate powder obtained by the spray drying with the spray dryer was introduced into a crucible made of alumina. In an air atmosphere, the powder was burned at 650° C. for 2 hours (heating rate, 15° C./min), subsequently burned at 1,075° C. for 1 hour (heating rate, 15° C./min; cooling rate, 10° C./min), and then disaggregated to obtain a lithium-nickel-manganese-cobalt composite oxide which had the composition $Li_{1.12}(Ni_{0.45}Mn_{0.45}Co_{0.10})O_2$ and had a lamellar structure. This composite oxide had an average primary-particle diameter of 0.6 µm, a median diameter of 7.5 µm, a 90% cumulative diameter ($D_{90}$) of 13.3 µm, a bulk density of 1.4 g/cc, and a BET specific surface area of 2.0 m²/g.

Example 2

$Li_2CO_3$, $NiCO_3$, $Mn_3O_4$, CoOOH, $H_3BO_3$, $WO_3$, and $Li_2SO_4$ were weighed out and mixed together so as to result in a Li:Ni:Mn:Co:B:W:S molar ratio of 1.12:0.45:0.45:0.10: 0.0025:0.015:0.0075. Thereafter, pure water was added thereto to prepare a slurry. A circulating wet-process pulverizer of the dispersing medium agitation type was used to pulverize the solid matter contained in the slurry to a median diameter of 0.50 µm while stirring the slurry.

Subsequently, this slurry (solid content, 38% by weight; viscosity, 1,100 cP) was spray-dried using a two-fluid nozzle type spray dryer (Type LT-8, manufactured by Ohkawara Kakohki Co., Ltd.). Air was used here as a drying gas, and the drying-gas introduction rate G and the slurry introduction rate S were regulated to 45 L/min and 6×10⁻³ L/min, respectively (gas-liquid ratio G/S=7,500). The dryer inlet temperature was set at 150° C. The particulate powder obtained by the spray drying with the spray dryer was introduced into a crucible made of alumina. In an air atmosphere, the powder was burned at 650° C. for 2 hours (heating rate, 15° C./min), subsequently burned at 1,100° C. for 1 hour (heating rate, 15° C./min; cooling rate, 10° C./min), and then disaggregated to obtain a lithium-nickel-manganese-cobalt composite oxide which had the composition $Li_{1.12}(Ni_{0.45}Mn_{0.45}Co_{0.10})O_2$ and had a lamellar structure. This composite oxide had an average primary-particle diameter of 0.6 µm, a median diameter of 7.8 µm, a 90% cumulative diameter ($D_{90}$) of 13.7 µm, a bulk density of 1.6 g/cc, and a BET specific surface area of 1.2 m²/g.

Example 3

$Li_2CO_3$, $NiCO_3$, $Mn_3O_4$, CoOOH, $H_3BO_3$, $WO_3$, and $Li_2SO_4$ were weighed out and mixed together so as to result in a Li:Ni:Mn:Co:B:W:S molar ratio of 1.15:0.45:0.45:0.10: 0.0025:0.015:0.0075. Thereafter, pure water was added thereto to prepare a slurry. A circulating wet-process pulverizer of the dispersing medium agitation type was used to pulverize the solid matter contained in the slurry to a median diameter of 0.50 µm while stirring the slurry.

Figure 8:
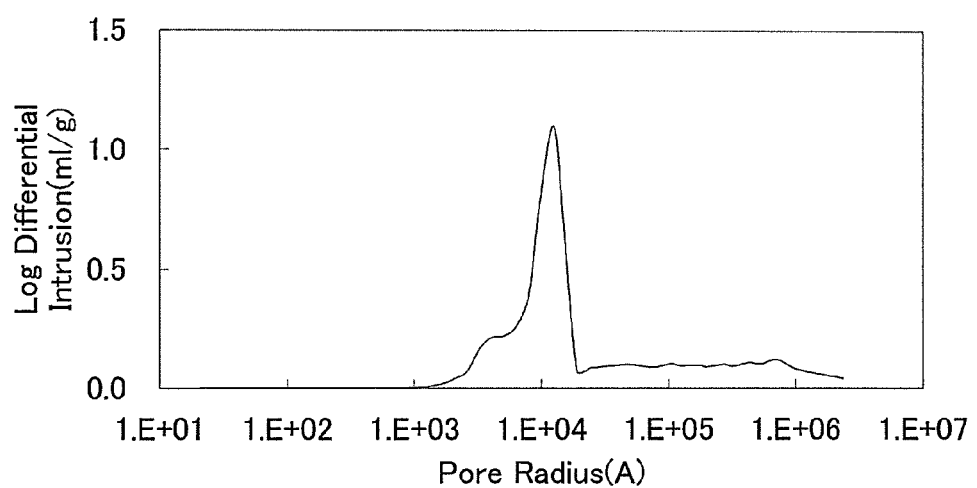
FIG. 8 is a pore distribution curve of the lithium-nickel-manganese-cobalt composite oxide powder produced in Example 3.

Subsequently, this slurry (solid content, 38% by weight; viscosity, 1,100 cP) was spray-dried using a two-fluid nozzle type spray dryer (Type LT-8, manufactured by Ohkawara Kakohki Co., Ltd.). Air was used here as a drying gas, and the drying-gas introduction rate G and the slurry introduction rate S were regulated to 45 L/min and 6×10⁻³ L/min, respectively (gas-liquid ratio G/S=7,500). The dryer inlet temperature was set at 150° C. The particulate powder obtained by the spray drying with the spray dryer was introduced into a crucible made of alumina. In an air atmosphere, the powder was burned at 650° C. for 2 hours (heating rate, 15° C./min), subsequently burned at 1,100° C. for 1 hour (heating rate, 15° C./min; cooling rate, 10° C./min), and then disaggregated to obtain a lithium-nickel-manganese-cobalt composite oxide which had the composition $Li_{1.12}(Ni_{0.45}Mn_{0.45}Co_{0.10})O_2$ and had a lamellar structure. This composite oxide had an average primary-particle diameter of 0.7 µm, a median diameter of 8.0 µm, a 90% cumulative diameter ($D_{90}$) of 14.7 µm, a bulk density of 1.7 g/cc, and a BET specific surface area of 1.3 m²/g. The pores thereof were examined by the mercury intrusion method. As a result, it was able to be ascertained that the pores had a peak at a pore radius of 80 nm or larger but less than 800 nm, as shown in FIG. 8. The increase in resistance through 100 cycles conducted at 60° C. and 1 C was 107%.

Comparative Example 1

$Li_2CO_3$, $NiCO_3$, $Mn_3O_4$, CoOOH, $H_3BO_3$, and $WO_3$ were weighed out and mixed together so as to result in a Li:Ni:Mn:Co:B:W molar ratio of 1.12:0.45:0.45:0.10:0.0025:0.015. Thereafter, pure water was added thereto to prepare a slurry. A circulating wet-process pulverizer of the dispersing medium agitation type was used to pulverize the solid matter contained in the slurry to a median diameter of 0.50 μm while stirring the slurry.

Subsequently, this slurry (solid content, 38% by weight; viscosity, 1,100 cP) was spray-dried using a two-fluid nozzle type spray dryer (Type LT-8, manufactured by Ohkawara Kakohki Co., Ltd.). Air was used here as a drying gas, and the drying-gas introduction rate G and the slurry introduction rate S were regulated to 45 L/min and $6 \times 10^{-3}$ L/min, respectively (gas-liquid ratio G/S=7,500). The dryer inlet temperature was set at 150° C. The particulate powder obtained by the spray drying with the spray dryer was introduced into a crucible made of alumina. In an air atmosphere, the powder was burned at 650° C. for 2 hours (heating rate, 15° C./min), subsequently burned at 1,075° C. for 1 hour (heating rate, 15° C./min; cooling rate, 10° C./min), and then disaggregated to obtain a lithium-nickel-manganese-cobalt composite oxide which had the composition $Li_{1.12}(Ni_{0.45}Mn_{0.45}Co_{0.10})O_2$ and had a lamellar structure. This composite oxide had an average primary-particle diameter of 0.5 μm, a median diameter of 6.8 μm, a 90% cumulative diameter ($D_{90}$) of 10.5 μm, a bulk density of 1.4 g/cc, and a BET specific surface area of 1.3 $m^2/g$.

Comparative Example 2

$Li_2CO_3$, $NiCO_3$, $Mn_3O_4$, CoOOH, $H_3BO_3$, and $WO_3$ were weighed out and mixed together so as to result in a Li:Ni:Mn:Co:B:W molar ratio of 1.12:0.45:0.45:0.10:0.0025:0.015. Thereafter, pure water was added thereto to prepare a slurry. A circulating wet-process pulverizer of the dispersing medium agitation type was used to pulverize the solid matter contained in the slurry to a median diameter of 0.50 μm while stirring the slurry.

Subsequently, this slurry (solid content, 38% by weight; viscosity, 1,100 cP) was spray-dried using a two-fluid nozzle type spray dryer (Type LT-8, manufactured by Ohkawara Kakohki Co., Ltd.). Air was used here as a drying gas, and the drying-gas introduction rate G and the slurry introduction rate S were regulated to 45 L/min and $6 \times 10^{-3}$ L/min, respectively (gas-liquid ratio G/S=7,500). The dryer inlet temperature was set at 150° C. The particulate powder obtained by the spray drying with the spray dryer was introduced into a crucible made of alumina. In an air atmosphere, the powder was burned at 650° C. for 2 hours (heating rate, 15° C./min), subsequently burned at 1,100° C. for 1 hour (heating rate, 15° C./min; cooling rate, 10° C./min), and then disaggregated to obtain a lithium-nickel-manganese-cobalt composite oxide which had the composition $Li_{1.12}(Ni_{0.45}Mn_{0.45}Co_{0.10})O_2$ and had a lamellar structure. This composite oxide had an average primary-particle diameter of 0.5 μm, a median diameter of 7.4 μm, a 90% cumulative diameter ($D_{90}$) of 11.6 μm, a bulk density of 1.6 g/cc, and a BET specific surface area of 1.1 $m^2/g$.

Comparative Example 3

$Li_2CO_3$, $NiCO_3$, $Mn_3O_4$, CoOOH, $H_3BO_3$, and $WO_3$ were weighed out and mixed together so as to result in a Li:Ni:Mn:Co:B:W molar ratio of 1.15:0.45:0.45:0.10:0.0025:0.015. Thereafter, pure water was added thereto to prepare a slurry. A circulating wet-process pulverizer of the dispersing medium agitation type was used to pulverize the solid matter contained in the slurry to a median diameter of 0.50 μm while stirring the slurry.

Subsequently, this slurry (solid content, 38% by weight; viscosity, 1,100 cP) was spray-dried using a two-fluid nozzle type spray dryer (Type LT-8, manufactured by Ohkawara Kakohki Co., Ltd.). Air was used here as a drying gas, and the drying-gas introduction rate G and the slurry introduction rate S were regulated to 45 L/min and $6 \times 10^{-3}$ L/min, respectively (gas-liquid ratio G/S=7,500). The dryer inlet temperature was set at 150° C. The particulate powder obtained by the spray drying with the spray dryer was introduced into a crucible made of alumina. In an air atmosphere, the powder was burned at 650° C. for 2 hours (heating rate, 15° C./min), subsequently burned at 1,100° C. for 1 hour (heating rate, 15° C./min; cooling rate, 10° C./min), and then disaggregated to obtain a lithium-nickel-manganese-cobalt composite oxide which had the composition $Li_{1.12}(Ni_{0.45}Mn_{0.45}Co_{0.10})O_2$ and had a lamellar structure. This composite oxide had an average primary-particle diameter of 0.5 μm, a median diameter of 7.4 μm, a 90% cumulative diameter ($D_{90}$) of 12.8 μm, a bulk density of 1.7 g/cc, and a BET specific surface area of 1.0 $m^2/g$. The increase in resistance through 100 cycles conducted at 60° C. and 1 C was 118%. The property values of the lithium-transition metal compound powders produced in the Examples and Comparative Examples are shown in Table 1.

TABLE 1

Property values of lithium-transition metal compound powders produced in Examples and Comparative Examples

| Positive-electrode material | | Average primary-particle diameter (μm) | Median diameter (μm) | 90% cumulative diameter ($D_{90}$) (μm) | Bulk density (g/cm³) | BET specific surface area (m²/g) | Evaluation |
|---|---|---|---|---|---|---|---|
| Example | 1 | 0.6 | 7.5 | 13.3 | 1.4 | 2.0 | ○ |
|  | 2 | 0.6 | 7.8 | 13.7 | 1.6 | 1.2 | ○ |
|  | 3 | 0.7 | 8.0 | 14.7 | 1.7 | 1.3 | ○ |
| Comparative Example | 1 | 0.5 | 6.8 | 10.5 | 1.4 | 1.3 | x |
|  | 2 | 0.6 | 7.4 | 11.6 | 1.6 | 1.1 | x |
|  | 3 | 0.5 | 7.4 | 12.8 | 1.7 | 1.0 | x |

For the purpose of comparison between the Examples and the Comparative Examples, that the property values of the powder of each Example with respect to average primary-particle diameter, median diameter, 90% cumulative diameter ($D_{90}$), bulk density, and BET specific surface area were substantially equal or superior to the property values of the powder of the corresponding Comparative Example was rated as ○.

It can be seen from Table 1 that the lithium-nickel-manganese-cobalt composite oxide powders produced in the Examples each had a larger specific surface area than the powders of the Comparative Examples although approximately equal in bulk density.

Figure 7:
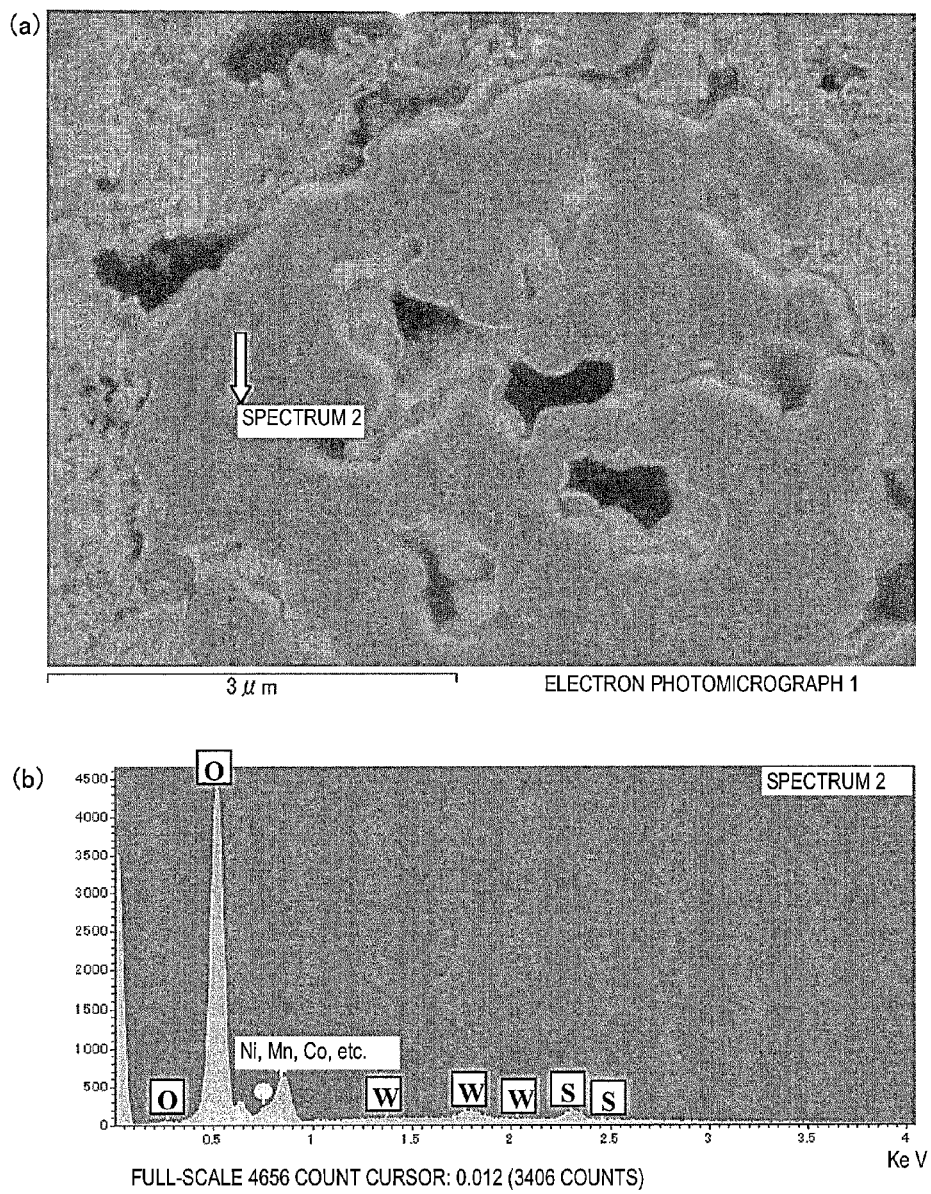
FIG. 7 (a) is an SEM-EDX image (photograph) of the lithium-nickel-manganese-cobalt composite oxide powder produced in Example 3, and FIG. 7 (b) is an SEM-EDX spectrum of the powder.

SEM images (photographs) (magnification, ×10,000) of the lithium-nickel-manganese-cobalt composite oxide powders produced in Examples 1 to 3 and Comparative Examples 1 to 3 are shown in FIGS. 1 to 6, and an SEM-EDX image (photograph) of the lithium-nickel-manganese-cobalt composite oxide powder produced in Example 3 is shown in FIG. 7.

[Production and Evaluation of Batteries]

The lithium-transition metal compound powders produced in the Examples and Comparative Examples described above each were used as a positive-electrode material (positive-electrode active material) to produce a lithium secondary battery by the following method. The battery was evaluated in the following manner.

(1) Rate Test:

Ingredients which had been weighed out so as to be configured of 75% by weight each of the mixed powders or unmixed powders produced in the Examples and Comparative Examples, 20% by weight acetylene black, and 5% by weight polytetrafluoroethylene powder were sufficiently mixed together by means of a mortar. The mixture was formed into a thin sheet, from which a disk was cut out using a punch having a diameter of 9 mm. This operation was conducted so that the disk as a whole had a weight of about 8 mg. This disk was press-bonded to an expanded aluminum metal to obtain a positive electrode having a diameter of 9 mm.

This positive electrode having a diameter of 9 mm and a lithium metal plate were used as a test electrode and a counter electrode, respectively, to assemble a coin cell, for which an electrolytic solution obtained by dissolving $LiPF_6$ in a concentration of 1 mol/L in a solvent composed of EC (ethylene carbonate)/DMC (dimethyl carbonate)/EMC (ethyl methyl carbonate)=3/3/4 (by volume) was used and a porous polyethylene film having a thickness of 25 μm was used as a separator. The coil cell obtained was subjected to the following test. In the first cycle, the cell was subjected to constant-current constant-voltage charge at 0.2 mA/cm$^2$ and an upper-limit voltage of 4.2 V and to constant-current discharge at 0.2 mA/cm$^2$ and a lower-limit voltage of 3.0 V. In the second cycle, the cell was subjected to constant-current constant-voltage charge at 0.5 mA/cm$^2$ and an upper-limit voltage of 4.2 V and to constant-current discharge at 0.2 mA/cm$^2$ and a lower-limit voltage of 3.0 V. Subsequently, in the third cycle, the cell was subjected to constant-current charge at 0.5 mA/cm$^2$ and to constant-current discharge at 11 mA/cm$^2$. The proportion of the discharge capacity Qh(100) as measured in the third cycle was calculated as capacity density using the following equation, and cell characteristics were compare in this value.

Capacity density [mAh/cm$^2$]=[discharge capacity in third cycle (mAh/g)]×[bulk density (g/cm$^2$)]

In Table 2 are shown the first-cycle initial discharge capacity, third-cycle high-rate discharge capacity, and capacity density of each of the cells respectively employing the mixed or unmixed powders of the Examples and Comparative Examples.

(2) High-Temperature Cycle Test:

Ingredients which had been weighed out so as to be configured of 75% by weight each of the mixed powders or unmixed powders produced in the Examples and Comparative Examples, 20% by weight acetylene black, and 5% by weight polytetrafluoroethylene powder were sufficiently mixed together by means of a mortar. The mixture was formed into a thin sheet, from which a disk was cut out using a punch having a diameter of 12 mm. This operation was conducted so that the disk as a whole had a weight of about 18 mg. This disk was press-bonded to an expanded aluminum metal to obtain a positive electrode having a diameter of 12 mm.

Using the results of the first-cycle charge/discharge in the rate test given under (1), the initial charge capacity and the initial discharge capacity per unit weight of the positive-electrode active material were expressed by Qs(C) [mAh/g] and Qs(D) [mAh/g], respectively. A graphite powder having an average particle diameter of 8-10 μm ($d_{002}$=3.35 Å) and poly(vinylidene fluoride) were used as a negative-electrode active material and a binder, respectively, and were weighed out in a weight ratio of 92.5:7.5 and mixed with each other in an N-methylpyrrolidone solution to obtain a negative-electrode mix slurry. This slurry was applied to one surface of a copper foil having a thickness of 20 μm, and the coating was dried to vaporize the solvent. Thereafter, a disk having a diameter of 12 mm was punched out of the coated foil and then pressed at 0.5 ton/cm$^2$ (49 MPa) to obtain a negative electrode. This operation was conducted so that the amount of the negative-electrode active material present in the electrode was about 5-12 mg.

This negative electrode and lithium metal were used as a test electrode and a counter electrode, respectively, to assemble a cell, and this cell was subjected to a test in which lithium ions were occluded in the negative electrode by a constant-current constant-voltage method (0.2 mA/cm$^2$, 3 mV; cutoff current, 0.05 mA) to a lower-limit voltage of 0 V. The initial occlusion capacity per unit weight of the negative-electrode active material, as measured in this test, was expressed by Qf [mAh/g].

The positive electrode and the negative electrode were used in combination together with coin cells to assemble a battery to be tested, and the performances of this battery were evaluated. The procedure was as follows. The positive electrode produced above was placed on a coin-cell positive-electrode can, and a porous polyethylene film having a thickness of 25 μm was placed thereon as a separator. This stack was held in place by a gasket made of polypropylene. Thereafter, an electrolytic solution obtained by dissolving $LiPF_6$ in a concentration of 1 mol/L in a solvent composed of EC (ethylene carbonate)/DMC (dimethyl carbonate)/EMC (ethyl methyl carbonate)=3/3/4 (by volume) was introduced as a nonaqueous electrolytic solution into the can and sufficiently infiltrated into the separator. Subsequently, the negative electrode described above was placed thereon, and a negative-electrode can was put thereon. The cans were sealed to produce a coin type lithium secondary battery. Incidentally, a balance between the weight of the positive-electrode active material and the weight of the negative-electrode active material was set so that the following equation held substantially.

(Weight of positive-electrode active material) [g])/
(weight of negative-electrode active material
[g])=(Qf [mAh/g]/1.2)Qs(C) [mAh/g]-

In order to determine the high-temperature load characteristics of the batteries thus obtained, the 1-hour-rate current value, i.e., 1 C, of each battery was set according to the following equation and the following test was conducted.

1 C [mA]=Qs(D)×(weight of positive-electrode active material [g])/(time [h])

First, at room temperature, two cycles of charge/discharge were conducted at a constant current of 0.2 C and one cycle of charge/discharge was conducted at a constant current of 1 C. Incidentally, the upper-limit voltage in charge was set at 4.1 V, and the lower-limit voltage was set at 3.0 V.

Subsequently, a test was performed in which the battery was subjected at a high temperature of 60° C. to one cycle of charge/discharge at a constant current of 0.2 C and then to 100 cycles of charge/discharge at a constant current of 1 C. Incidentally, the upper-limit voltage in charge was set at 4.1 V, and the lower-limit voltage was set at 3.0 V. The proportion of the discharge capacity Qh(100) as measured in the 100th cycle of 1-C charge/discharge conducted at 60° C. in this test was calculated as capacity retention after high-temperature cycling (retention after cycling) P using the following equation. The high-temperature characteristics of the batteries were compared in the value of this retention.

$P[\%]=\{Qh(100)/Qh(1)\} \times 100$

In Table 2 are shown the values of the retention after 60° C. cycling (P) of the batteries respectively employing the positive-electrode active materials for lithium secondary batteries produced in the Examples and Comparative Examples.

In order to determine the low-temperature load characteristics of the batteries, the 1-hour-rate current value, i.e., 1 C, of each battery was set according to the following equation and the following test was conducted.

Before and after 60° C. 1-C cycling, each coin cell was examined for resistance in the following manner. The coin cell was regulated so as to have a state of charge of 40% by charge/discharge conducted at a constant current of ⅓ C. This coin cell was held in a −30° C. low-temperature atmosphere for 1 hour or longer and then discharged at a constant current of 0.5 C [mA] for 10 seconds. The voltage as measured after the 10 seconds was expressed by V [mV], and the voltage as measured before the discharge was expressed by $V_0$ [mV]. The value of resistance R [Ω] was calculated using the following equation, wherein $\Delta V = V - V_0$.

$R[\Omega]=\Delta V$ [mV]/0.5 C [mA]

With respect to the resistance increase through 100 cycles conducted at 60° C. and 1 C, the resistance value R [Ω] was calculated using the following equation.

Resistance increase [%]=(resistance after 100 cycles R1)/(resistance before the cycling R2)×100

For the purpose of comparison between the Examples and the Comparative Examples, that the values of battery characteristics of each Example with respect to the rate test, capacity density, and P (capacity retention after cycling) were substantially equal or superior to the battery characteristics values of the corresponding Comparative Example was rated as ○, which is a criterion that indicates that the Example is acceptable.

It can be seen from Table 2 that lithium secondary batteries having excellent high-current-density discharge characteristics can be rendered possible according to the lithium-nickel-manganese-cobalt composite oxide powders and the like of the invention for use as positive-electrode materials for lithium secondary batteries. Furthermore, a comparison between Example 3 and Comparative Example 3 in resistance increase shows that the Example further has the effect of inhibiting the increase in resistance which accompanies cycling.

As described above, it can be seen that the lithium-nickel-manganese-cobalt composite oxide powders of the invention each can be an active material which has a large specific surface area and a high bulk density.

It can hence be seen that the powders of the invention attain a high battery capacity per unit electrode area (capacity density) and render an increase in capacity possible.

When such a powder is used as a positive-electrode material for lithium secondary batteries, not only it is possible to attain a cost reduction, higher safety and an increase in capacity but also an improvement in powder handleability due to an improvement in bulk density can be attained.

While the invention has been described in detail and with reference to specific embodiments thereof, it will be apparent to one skilled in the art that various changes and modifications can be made therein without departing from the spirit and scope thereof. This application is based on a Japanese patent application filed on Apr. 1, 2010 (Application No. 2010-085563), the contents thereof being incorporated herein by reference.

INDUSTRIAL APPLICABILITY

Applications of lithium secondary batteries employing the lithium-transition metal composite oxide powders of the invention are not particularly limited, and the batteries can be used in various known applications. Examples thereof include notebook type personal computers, pen-input personal computers, mobile personal computers, electronic-book players, portable telephones, portable facsimile telegraphs, portable copiers, portable printers, headphone stereos, video movie cameras, liquid-crystal TVs, handy cleaners, portable CD players, mini-disk players, transceiv-

TABLE 2

Battery characteristics of lithium-transition metal compound powders produced in Examples and Comparative Examples

| Positive-electrode material | | Discharge capacity in first cycle (mAh/g)/ 3.0-4.2 V; 0.2 mA/cm² | Discharge capacity in third cycle (mAh/g)/ 3.0-4.2 V; 11 mA/cm² | [1])Capacity density mAh/cm³ | P (capacity retention after cycling) (%) | Evaluation results |
|---|---|---|---|---|---|---|
| Example | 1 | 144 | 102 | 143 | 85 | ○ |
|  | 2 | 144 | 102 | 163 | 85 | ○ |
|  | 3 | 143 | 103 | 175 | — | ○ |
| Comparative | 1 | 141 | 98 | 137 | 85 | Δ |
| Example | 2 | 142 | 97 | 155 | 85 | Δ |
|  | 3 | 143 | 99 | 168 | — | Δ |

[1])Capacity density = (discharge capacity in third cycle)/(bulk density)

ers, electronic pocketbooks, electronic calculators, memory cards, portable tape recorders, radios, backup power sources, motors, illuminators, toys, game machines, clocks and watches, stroboscopes, cameras, pace makers, power tools, power sources for motor vehicles, power sources for tracked vehicles, and power sources for artificial satellites.

The invention claimed is:

1. A lithium-transition metal compound powder, comprising:
   a lithium-transition metal compound capable of an insertion and elimination of lithium ions,
   wherein an inner part of particles in the powder comprises a compound that, when analyzed by an SEM-EDX method, has a peak derived from a Group-16 element of the third or later periods of the periodic table and an element of the Group-5 to Group-7 elements of the fifth and sixth periods of the periodic table, and
   the powder is suitable for a positive-electrode material of a lithium secondary battery, wherein the lithium-transition metal compound is a powder comprising secondary particles that comprise primary particles of two or more compositions, and
   an inner part of the secondary particles comprises primary particles of a compound that, when analyzed by an SEM-EDX method, has peaks derived from a Group-16 element of the third or later periods of the periodic table and an element of the Group-5 to Group-7 elements of the fifth and sixth periods of the periodic table,
   wherein a molar ratio of sum of S, Se, Te and Po to the a sum of metallic elements other than Li, S, Se, Te, Po, Mo, W, Nb, Ta, and Re in surface parts of the secondary particles is not more than 500 times a molar ratio of a sum of S, Se, Te and Po to a sum of metallic elements other than Li, S, Se, Te, Po, Mo, W, Nb, Ta and Re in an entirety of the secondary particles.

2. The powder of claim 1,
   wherein a pore distribution curve of the lithium-transition metal compound has a peak at a pore radius of 80 nm or larger but less than 800 nm.

3. A positive electrode comprising:
   a binder,
   a current collector, and
   a positive-electrode active-material layer comprising the powder of claim 1.

4. A lithium secondary battery, comprising:
   a negative electrode capable of occluding and releasing lithium,
   a nonaqueous electrolyte comprising a lithium salt, and
   the positive electrode of claim 3,
   wherein the positive electrode is capable of occluding and releasing lithium.

5. The powder of claim 1, wherein the powder has a lamellar structure or a spinel structure.

6. The powder of claim 5, wherein the powder has a lamellar structure.

7. The powder of claim 1, wherein the molar ratio in the surface parts is 1.05 times or more of the molar ratio in the entirety.

8. The powder of claim 1, wherein the molar ratio in the surface parts is 300 times or less of the molar ratio in the entirety.

9. A lithium-transition metal compound powder, comprising:
   a lithium-transition metal compound capable of an insertion and elimination of lithium ions,
   wherein an inner part of particles in the powder comprises a compound that, when analyzed by an SEM-EDX method, has a peak derived from a Group-16 element of the third or later periods of the periodic table and an element of the Group-5 to Group-7 elements of the fifth and sixth periods of the periodic table, and
   the powder is suitable for a positive-electrode material of a lithium secondary battery, wherein the lithium-transition metal compound is a powder comprising secondary particles that comprise primary particles of two or more compositions, and
   an inner part of the secondary particles comprises primary particles of a compound that, when analyzed by an SEM-EDX method, has peaks derived from a Group-16 element of the third or later periods of the periodic table and an element of the Group-5 to Group-7 elements of the fifth and sixth periods of the periodic table,
   wherein a molar ratio of a sum of Mo, W, Nb, Ta, and Re to a sum of metallic elements other than Li, S, Se, Te, Po, Mo, W, Nb, Ta, and Re in surface parts of the secondary particles is not less than 1.05 times a molar ratio of a sum of Mo, W, Nb, Ta, and Re to a sum of metallic elements other than Li, S, Se, Te, Po, Mo, W, Nb, Ta, and Re in an entirety of the secondary particles.

10. The powder of claim 9, wherein the Group-16 element comprises S, Se, or both.

11. The powder of claim 9, wherein the molar ratio in the surface parts is 200 times or less of the molar ratio in the entirety.

12. The powder of claim 9, wherein the molar ratio in the surface parts is 1.05 times or more of the molar ratio in the entirety.

13. The powder of claim 9, wherein the molar ratio in the surface parts is 300 times or less of the molar ratio in the entirety.

* * * * *